United States Patent
Lopes

(10) Patent No.: US 9,015,290 B2
(45) Date of Patent: *Apr. 21, 2015

(54) ENHANCED NETWORK ADAPTER FRAMEWORK

(75) Inventor: Marcio Jose Lopes, Rio De Janeiro (BR)

(73) Assignee: Accenture Global Services Limited, Dublin (IE)

( * ) Notice: Subject to any disclaimer, the term of this patent is extended or adjusted under 35 U.S.C. 154(b) by 385 days.

This patent is subject to a terminal disclaimer.

(21) Appl. No.: 13/620,535

(22) Filed: Sep. 14, 2012

(65) Prior Publication Data

US 2013/0013758 A1 Jan. 10, 2013

Related U.S. Application Data

(60) Division of application No. 13/206,564, filed on Aug. 10, 2011, now Pat. No. 8,533,302, which is a continuation of application No. 12/463,737, filed on May 11, 2009, now Pat. No. 8,019,839.

(51) Int. Cl.
G06F 15/177 (2006.01)
G06F 9/54 (2006.01)
G06F 9/445 (2006.01)
H04L 12/24 (2006.01)

(52) U.S. Cl.
CPC ............ *G06F 9/546* (2013.01); *G06F 9/44505* (2013.01); *G06F 9/541* (2013.01); *H04L 41/0856* (2013.01)

(58) Field of Classification Search
USPC .......................................... 709/220–221, 224
See application file for complete search history.

(56) References Cited

U.S. PATENT DOCUMENTS

| | | |
|---|---|---|
| 5,452,239 A | 9/1995 | Dai et al. |
| 7,089,826 B2 | 8/2006 | Marrocco et al. |
| 7,093,013 B1 | 8/2006 | Hornok, Jr. et al. |
| 7,093,989 B2 | 8/2006 | Walmsley et al. |
| 7,104,896 B2 | 9/2006 | Wood |
| 7,120,463 B2 | 10/2006 | Mathews |
| 7,121,653 B2 | 10/2006 | Lai |
| 7,127,517 B2 | 10/2006 | Heisig et al. |
| 7,127,541 B2 | 10/2006 | Govindarajulu et al. |

(Continued)

FOREIGN PATENT DOCUMENTS

| | | |
|---|---|---|
| EP | 1971163 | 9/2008 |
| WO | WO03083600 | 10/2003 |

OTHER PUBLICATIONS

The State Intellectual Property Office of the People's Republic of China Notification of the First Office Action (with translation) for Application No. 200910166950.0 dated Sep. 4, 2013, 11 pages.

(Continued)

*Primary Examiner* — Philip B Tran
(74) *Attorney, Agent, or Firm* — Fish & Richardson P.C.

(57) ABSTRACT

An enhanced network adapter framework, in which parameters are stored in a configuration table, the parameters being customized for a network and an application. A network adapter customized for the network and the application is instantiated based on invoking a generic network adapter which externally references the configuration table, and communication between the application and the network is effected using the instantiated network adapter.

18 Claims, 16 Drawing Sheets

(56) References Cited

U.S. PATENT DOCUMENTS

| | | |
|---|---|---|
| 7,139,907 B2 | 11/2006 | Bakke et al. |
| 7,147,030 B2 | 12/2006 | Dalle Nogare et al. |
| 7,153,142 B2 | 12/2006 | Shifris et al. |
| 7,156,131 B2 | 1/2007 | Adams et al. |
| 7,159,823 B1 | 1/2007 | Paustian, Jr. et al. |
| 7,163,345 B2 | 1/2007 | Walmsley et al. |
| 7,181,048 B2 | 2/2007 | Blume |
| 7,182,108 B2 | 2/2007 | Williamson |
| 7,188,928 B2 | 3/2007 | Walmsley et al. |
| 7,197,100 B2 | 3/2007 | Bunton et al. |
| 7,210,162 B2 | 4/2007 | Albright |
| 7,219,149 B2 | 5/2007 | Ofir et al. |
| 7,224,784 B2 | 5/2007 | Creamer et al. |
| 7,225,253 B2 | 5/2007 | Ofir et al. |
| 7,241,244 B2 | 7/2007 | Wang |
| 7,243,193 B2 | 7/2007 | Walmsley |
| 7,252,353 B2 | 8/2007 | Silverbrook et al. |
| 7,266,390 B2 | 9/2007 | Mathews |
| 7,266,622 B2 | 9/2007 | Flanigan et al. |
| 7,266,661 B2 | 9/2007 | Walmsley |
| 7,267,417 B2 | 9/2007 | Silverbrook et al. |
| 7,273,434 B1 | 9/2007 | Rossler |
| 7,275,805 B2 | 10/2007 | Jackson Pulver et al. |
| 7,277,529 B1 | 10/2007 | Wuthnow et al. |
| 7,281,330 B2 | 10/2007 | Silverbrook et al. |
| 7,281,777 B2 | 10/2007 | Silverbrook et al. |
| 7,281,953 B1 | 10/2007 | Jochym et al. |
| 7,283,635 B1 | 10/2007 | Anderson et al. |
| 7,284,267 B1 | 10/2007 | McArdle et al. |
| 7,284,912 B2 | 10/2007 | Suzuki et al. |
| 7,286,647 B2 | 10/2007 | Stormon et al. |
| 7,290,852 B2 | 11/2007 | Jackson Pulver et al. |
| 7,300,421 B1 | 11/2007 | Lowry et al. |
| 7,302,108 B2 | 11/2007 | Hanes et al. |
| 7,305,724 B2 | 12/2007 | Rozental et al. |
| 7,309,039 B1 | 12/2007 | Stone |
| 7,314,261 B2 | 1/2008 | Jackson Pulver et al. |
| 7,325,019 B2 | 1/2008 | Lam et al. |
| 7,328,956 B2 | 2/2008 | Silverbrook et al. |
| 7,337,245 B2 | 2/2008 | McClure et al. |
| 7,337,257 B2 | 2/2008 | Landron et al. |
| 7,349,779 B2 | 3/2008 | Nelson |
| 7,354,372 B2 | 4/2008 | Wang |
| 7,357,653 B2 | 4/2008 | Hung et al. |
| 7,364,109 B2 | 4/2008 | Kuo |
| 7,374,266 B2 | 5/2008 | Walmsley et al. |
| 7,376,546 B2 | 5/2008 | Dominguez et al. |
| 7,377,609 B2 | 5/2008 | Walmsley et al. |
| 7,380,006 B2 | 5/2008 | Srinivas et al. |
| 7,390,071 B2 | 6/2008 | Walmsley et al. |
| 7,395,352 B1 | 7/2008 | Lam et al. |
| 7,395,359 B2 | 7/2008 | Reister |
| 7,395,367 B2 | 7/2008 | Boyd et al. |
| 7,395,540 B2 | 7/2008 | Rogers |
| 7,406,525 B2 | 7/2008 | Higgins et al. |
| 7,406,698 B2 | 7/2008 | Richardson |
| 7,412,548 B2 | 8/2008 | Sichner |
| 7,421,709 B2 | 9/2008 | Watson et al. |
| 7,426,726 B1 | 9/2008 | Barker |
| 7,475,150 B2 | 1/2009 | Grabarnik et al. |
| 7,769,899 B2 | 8/2010 | Grabarnik et al. |
| 7,831,655 B2 | 11/2010 | Upton |
| 8,019,839 B2 * | 9/2011 | Lopes .......................... 709/221 |
| 2003/0093404 A1 | 5/2003 | Bader et al. |
| 2003/0093470 A1 | 5/2003 | Upton |
| 2004/0128201 A1 | 7/2004 | Ofir et al. |
| 2004/0158842 A1 | 8/2004 | Gilfix et al. |
| 2004/0181753 A1 | 9/2004 | Michaelides |
| 2004/0187095 A1 | 9/2004 | Gilfix et al. |
| 2004/0216147 A1 | 10/2004 | Yanosy et al. |
| 2005/0114378 A1 | 5/2005 | Elien et al. |
| 2005/0149941 A1 | 7/2005 | Watson et al. |
| 2006/0053477 A1 | 3/2006 | Grabarnik et al. |
| 2008/0228901 A1 | 9/2008 | Choi et al. |
| 2009/0164500 A1 | 6/2009 | Mathur et al. |
| 2009/0271518 A1 | 10/2009 | Manchanda et al. |

OTHER PUBLICATIONS

EPO Extended European Search Report for Application No. 09251697.0 dated Dec. 7, 2011, 10 pages.
U.S. Notice of Allowance for U.S. Appl. No. 12/463,737 dated Jun. 3, 2011, 9 pages.
U.S. Non-Final Office Action for U.S. Appl. No. 12/463,737 dated Dec. 22, 2010, 15 pages.
U.S. Final Office Action for U.S. Appl. No. 12/463,737 dated May 13, 2011, 10 pages.
U.S. Notice of Allowance for U.S. Appl. No. 13/206,564 dated May 9, 2013, 8 pages.

* cited by examiner

| | COMMAND_ID 802 | COMMAND_DESCRIPTION 806 | COMMAND_EXPRESSION 812 | TIMEOUT 810 |
|---|---|---|---|---|
| 1 | ACT_CM_HUA_001 | LOGIN HUAWEI | LOGIN:::<INSERT_CTAG_HERE>::UN=[:@ACT_HUAWEI_USER:] | 5000 |
| 2 | ACT_CM_HUA_002 | PORT DISABLE ADSL HUAWEI | DACT-ADSLPORT::DEV=[:#ACT_HUAWEI_DEVICE_NAME:],FN=[: | 5000 |
| 3 | ACT_CM_HUA_003 | MODIFY PARAMETERS ADSL HUAWEI | MOD-ADSLPORT::DEV=[:#ACT_HUAWEI_DEVICE_NAME:],FN=[: | 5000 |
| 4 | ACT_CM_HUA_004 | ENABLE PORT ADSL HUAWEI | ACT-ADSLPORT::DEV=[:#ACT_HUAWEI_DEVICE_NAME:],FN=[: | 5000 |
| 5 | ACT_CM_HUA_005 | LOGOUT HUAWEI | LOGOUT:::<INSERT_CTAG_HERE>::; | 5000 |
| 6 | ACT_CM_HUA_006 | MODIFY PARMS ADSL HUAWEI DEF | MOD-ADSLPORT::DEV=[:#ACT_HUAWEI_DEVICE_NAME:] | |
| 7 | ACT_CM_HUA_007 | MODIFY PARMS ADSL HUAWEI OLD | MOD- | |
| 8 | ACT_CM_ZTE_001 | LOGIN ZTE | ACT-U | |
| 9 | ACT_CM_ZTE_002 | MODIFY PROFILE ADSL ZTE | CHG- | |
| 10 | ACT_CM_ZTE_003 | MODIFY ALIAS ADSL ZTE | CRT-F | |
| 11 | ACT_CM_ZTE_004 | ENABLE PORT ADSL ZTE | CHG- | |
| 12 | ACT_CM_ZTE_005 | LOGOUT ZTE | CANC | |
| 13 | ACT_CM_ZTE_006 | MODIFY PROFILE ADSL ZTE DEFAULT | CHG- | |
| 14 | ACT_CM_ZTE_007 | MODIFY ALIAS ADSL ZTE DEFAULT VA | CRT-F | |
| 15 | ACT_CM_ZTE_008 | MODIFY PROFILE ADSL ZTE OLD VALU | CHG- | |
| 16 | ACT_CM_ALC_001 | LOGIN ALC | ACT-U | |
| 17 | ACT_CM_ALC_002 | START SESSION COMMANDS | STA-C | |
| 18 | ACT_CM_ALC_003 | DISABLE PORT ADSL | ED-AD | |
| 19 | ACT_CM_ALC_004 | MODIFY PARAMETERS ADSL | ED-AD | |
| 20 | ACT_CM_ALC_005 | DISABLE PORT ADSL | ED-ADSL:[:#ACT_ALCATEL_DEVICE_NAME:]:ADSL-[:#ACT_ALC | 5000 |
| 21 | ACT_CM_ALC_006 | ENABLE PORT ADSL | ED-ADSL:[:#ACT_ALCATEL_DEVICE_NAME:]:ADSL-[:#ACT_ALC | 5000 |
| 22 | ACT_CM_ALC_007 | DISABLE PORT XDSL | ED-XDSL:[:#ACT_ALCATEL_DEVICE_NAME:]:XDSL-[:#ACT_ALC | 5000 |

Edit Value 804

Line Terminator: Platform Default 814

Value: 816 818

LOGIN:::<INSERT_CTAG_HERE>::UN=[:@ACT_HUAWEI_US
ER:],PWD=[:@ACT_HUAWEI_PASSWORD:]; 808

822
824

Add 818 OK Cancel

| ID_SERVICE | ID_COMMAND | SEQ_COMMAND | SERVICE_ROLLBACK | ENABLE_ROLLBACK | CONDITIONAL_COMMAND |
|---|---|---|---|---|---|
| SV_001 | CM_001 | 10 | NULL | N | NULL |
| SV_001 | CM_002 | 20 | SV_006 | S | NULL |
| SV_001 | CM_003 | 30 | SV_007 | S | NULL |
| SV_001 | CM_004 | 40 | SV_007 | S | NULL |
| SV_001 | CM_005 | 50 | NULL | N | NULL |
| SV_002 | CM_001 | 10 | NULL | N | NULL |
| SV_002 | CM_002 | 20 | SV_006 | S | NULL |
| SV_002 | CM_006 | 30 | SV_010 | S | NULL |
| SV_002 | CM_005 | 40 | NULL | N | NULL |
| SV_003 | CM_001 | 10 | NULL | N | NULL |
| SV_003 | CM_002 | 20 | SV_006 | S | NULL |
| SV_003 | CM_003 | 30 | SV_008 | S | NULL |
| SV_003 | CM_004 | 40 | SV_009 | S | NULL |
| SV_003 | CM_005 | 50 | NULL | N | NULL |
| SV_004 | CM_001 | 10 | NULL | N | NULL |
| SV_004 | CM_002 | 20 | SV_006 | S | NULL |
| SV_005 | CM_005 | 30 | NULL | N | NULL |
| SV_005 | CM_001 | 10 | NULL | N | NULL |
| SV_005 | CM_004 | 20 | SV_006 | S | NULL |
| SV_005 | CM_005 | 30 | NULL | N | NULL |
| SV_006 | CM_006 | 10 | NULL | N | NULL |
| SV_007 | CM_005 | 20 | NULL | N | NULL |

| ID_MESSAGE 1212 | EXPR_MESSAGE 1204 1214 |
|---|---|
| MS_001 | (?m)ENDESC=Succeeded |
| MS_002 | (?m)ENDESC=User relogin error |
| MS_003 | (?m)ENDESC=The user or password error |
| MS_004 | (?m)ENDESC=The account is locked, please consult the administrator |
| MS_005 | (?m)ENDESC=The system is busy, please try again later |
| MS_006 | (?m)ENDESC=Command syntax error |
| MS_007 | (?m)ENDESC=Port has been deactivated |
| MS_008 | (?m)ENDESC=User does not log in |
| MS_009 | (?m)ENDESC=The device does not exist |
| MS_010 | (?m)ENDESC=Missing, invalid parameter or mandatory parameter is null, or Value of parameter is wrong |
| MS_011 | (?m)ENDESC=Port has been activated or activating |
| MS_012 | (?m)ENDESC=This port is not ADSL port |
| MS_013 | (?m)ENDESC=No such span profile exists |
| MS_014 | (?m)ENDESC=Invalid username or password. Please enter again |
| MS_015 | (?m)ENDESC=The resource dose not exist or its type is wrong |
| MS_016 | (?m)ENDESC=The profile does not exist |
| MS_017 | (?m)ENDESC=Port being activated |
| MS_018 | (?m)ENDESC=Port does not exist |
| MS_019 | (?m)ENDESC=Board does not exist |
| MS_020 | (?m)ENDESC=port has been activated |
| MS_021 | (?m)ENDESC=xDSL port activating |
| MS_022 | (?m)ENDESC=Subrack number or slot number error |
| MS_023 | (?m)ENDESC=Invalid frame ID |
| MS_024 | (?m)ENDESC=Invalid Slot ID |
| MS_025 | (?m)ENDESC=Invalid port ID |
| MS_026 | (?m)ENDESC=xDSL port deactivate |
| MS_031 1208 | . 1206 |

FIG. 12

| ID_COM-MAND | ID_MES-SAGE | SEQ_MESSAGE | SUPPRESS ROLLBACK | SUBTYPE | RESULT_TYPE | RESULT_CODE | MESSAGE_DESC |
|---|---|---|---|---|---|---|---|
| CM_001 | MS_001 | 10 | S | Success | SUCCESS | 0000 | Success |
| CM_001 | MS_002 | 20 | S | Success forced: configuration already executed | SUCCESS | 0000 | Success forced: config |
| CM_001 | MS_003 | 30 | S | Connection Error - Invalid access information | FATAL_ERROR | AAFN-6101E | Connection Error - Inv |
| CM_001 | MS_004 | 40 | S | Connection Error - Invalid access information | FATAL_ERROR | AAFN-6101E | Connection Error - Inv |
| CM_001 | MS_005 | 50 | N | Error - Network Instable | NON_FATAL_ER | AAFN-6201E | Error - Network Instab |
| CM_001 | MS_006 | 60 | N | Syntax error | FATAL_ERROR | AAFN-6102E | Syntax error |
| CM_001 | MS_014 | 70 | S | Connection Error - Invalid access information | FATAL_ERROR | AAFN-6101E | Connection Error - Inv |
| CM_001 | MS_031 | 80 | N | Unknown error | FATAL_ERROR | AAFN-6106E | Unknown error |
| CM_002 | MS_001 | 10 | S | Success | SUCCESS | 0000 | Success |
| CM_002 | MS_007 | 20 | S | Success forced: configuration already executed | SUCCESS | 0000 | Success forced: config |
| CM_002 | MS_005 | 30 | N | Error - Network Instable | NON_FATAL_ER | AAFN-6201E | Error - Network Instab |
| CM_002 | MS_006 | 40 | N | Syntax error | FATAL_ERROR | AAFN-6102E | Syntax error |
| CM_002 | MS_008 | 50 | N | User not authenticated | NON_FATAL_ER | AAFN-6202E | User not authenticated |
| CM_002 | MS_009 | 60 | N | Object doesn't exist in the network | FATAL_ERROR | AAFN-6105E | Object doesn't exist in |
| CM_002 | MS_010 | 70 | N | Domain or data type invalid | FATAL_ERROR | AAFN-6104E | Domain or data type in |
| CM_002 | MS_015 | 80 | N | Object doesn't exist in the network | FATAL_ERROR | AAFN-6105E | Object doesn't exist in |
| CM_002 | MS_018 | 90 | N | Domain or data type invalid | FATAL_ERROR | AAFN-6104E | Domain or data type in |
| CM_002 | MS_019 | 100 | N | Domain or data type invalid | FATAL_ERROR | AAFN-6104E | Domain or data type in |
| CM_002 | MS_026 | 110 | S | Success forced: configuration already executed | SUCCESS | 0000 | Success forced: config |
| CM_002 | MS_027 | 120 | S | Success forced: configuration already executed | SUCCESS | 0000 | Success forced: config |
| CM_002 | MS_029 | 130 | N | Error - Network Instable | NON_FATAL_ER | AAFN-6201E | Error - Network Instab |
| CM_002 | MS_030 | 140 | N | Error - Network Instable | NON_FATAL_ER | AAFN-6201E | Error - Network Instab |
| CM_002 | MS_031 | 150 | N | Unknown error | FATAL_ERROR | AAFN-6106E | Unknown error |
| CM_003 | MS_001 | 10 | S | Success | SUCCESS | 0000 | Success |
| CM_003 | MS_011 | 20 | N | Port status doesn't allowed configuration | FATAL_ERROR | AAFN-6103E | Port status doesn't allo |

FIG. 13

ENHANCED NETWORK ADAPTER FRAMEWORK

CROSS-REFERENCE TO RELATED APPLICATION

This application is a divisional of U.S. application Ser. No. 13/206,564, filed on Aug. 10, 2011, which is a continuation of, and claims the benefit of priority under 35 USC 120 to, U.S. application Ser. No. 12/463,737, filed on May 11, 2009, which are considered part of (and are incorporated by reference in) the disclosure of this application.

FIELD

The present disclosure generally relates to custom network adapters.

BACKGROUND

One approach for creating a custom network adapter for effecting communication between a particular application and network is to hard-code the various communication parameters for the network adapter into the network adapter's software, (e.g., JAVA, C, C++, Ada, Assembly code or other software). If a second custom network adapter is needed, for instance if a different application or network are substituted, the software code of the initial network adapter would have to be re-coded in some way in order to change its communication parameters.

SUMMARY

According to one general implementation, a generic network adapter includes external references within its code to parameter tables. Custom network adapters, such as network adapters used with the TELCORDIA® ACTIVATOR or other applications, may be created by adjusting the parameter tables using, for example, a Structured Query Language (SQL) editor (e.g., TOAD, PL/SQL Developer, etc.), a straightforward table or text editor, or any other editor. In doing so, less revision of actual software, such as JAVA code, is required, reducing the need to store and maintain multiple different software components (e.g., JAVA components or other software components) for each particular network configuration. For example, solutions for systems using generic network adapters can use any suitable software, such as JAVA, C, C++, Ada, Assembly, etc.)

Among others, the one or more parameter tables may include a first parameter table which maps each service to the multiple commands required to implement that service; a second table which, using regular expressions, maps messages returned from the network to unique message identifiers that are capable of being understood by the application or network adapter framework; a third table which determines command outcomes based on the unique message identifier and the input command; and a fourth table which includes an eXtensible Markup Language (XML) template for each command outcome which is used to generate response messages that may be communicated to the application.

According to another general implementation, a computer-implemented process includes storing parameters in one or more configuration tables, the parameters being customized for a network and an application, and instantiating a network adapter customized for the network and the application by invoking a generic network adapter which externally references the one or more configuration tables. The process also includes effecting communication between the application and the network using the instantiated network adapter.

Implementations may include one or more of the following features. For instance, effecting communication between the application and the network using the instantiated network adapter may further include receiving a request from the application to perform a service on the network, identifying commands and a sequence of the commands associated with the service based on referencing a unique identifier of the service in a first configuration table, transmitting a command, in sequence, to the network, receiving a response to the command from the network, identifying a unique message identifier associated with the response based on executing regular expressions listed in a second configuration table, and determining an outcome of the command based on referencing the unique message identifier associated with the response and a unique identifier of the command in a third configuration table.

In other examples, effecting communication between the application and the network using the instantiated network adapter may further include determining an outcome of the service based on determining outcomes of all commands associated with the service, selecting an XML return message, including General Adapter Declarative Expression (GADE) variables, based on referencing the outcome of the service in a fourth configuration table, populating the GADE variables using one or more result values associated with the outcomes of all commands associated with the service, and providing the XML return message, populated with result values, to the application.

In further examples, the service may be selected from an Asymmetric Digital Subscriber Line (ADSL) port disable service, an ADSL modify parameters service, or an ADSL enable port service. An asymmetric digital subscriber line is a digital subscriber line (DSL) where the upload speed may be different from the download speed. The regular expressions for each possible response to the command may be listed with associated unique message identifiers in the second configuration table. The second configuration table may list a catch-all regular expression for all previously unknown or unidentified responses sent by the network, and a unique message identifier for the catch-all regular expression. The outcome may identify whether the command was successful or whether a fatal or non-fatal error has occurred, and whether rollback is suppressed or not suppressed. The outcome may further identify a result value. The application may be the TELCORDIA® ACTIVATOR or other application.

In additional examples, the generic network adapter may be a JAVA EE-based network adapter. The parameters may include or describe values for rules implementing process flows. The parameters include responses that may be expressed as regular expressions, and may include commands capable of being sent from the application to the network, or responses to the commands capable of being sent from the network to the application. The process may also include invoking the generic adapter using a single configuration load of the one or more configuration tables, or detecting a type of the network and the application and selecting the one or more configuration tables from among a plurality of configuration tables based on the detected type of the network and the application. The parameters may include actions associated with a loopback mode, a network emulator mode, and a network mode. The parameters may include service definitions. The parameters include values that are included in XML requests generated by the Activator. For example, the values may be used to fill the GADE variables.

According to another general implementation, a system includes one or more computers, and a computer-readable medium coupled to the one or more computers having instructions stored thereon which, when executed by the one or more computers, cause the one or more computers to perform operations. The operations include storing parameters in one or more configuration tables, the parameters being customized for a network and an application, instantiating a network adapter customized for the network and the application by invoking a generic network adapter which externally references the one or more configuration tables, and effecting communication between the application and the network using the instantiated network adapter.

Implementations may include one or more of the following features. For example, effecting communication between the application and the network using the instantiated network adapter further may further include receiving a request from the application to perform a service on the network, identifying commands and a sequence of the commands associated with the service based on referencing a unique identifier of the service in a first configuration table, transmitting a command, in sequence, to the network, receiving a response to the command from the network, identifying a unique message identifier associated with the response based on executing regular expressions listed in a second configuration table, and determining an outcome of the command based on referencing the unique message identifier associated with the response and a unique identifier of the command in a third configuration table.

According to another general implementation, a computer storage medium is encoded with a computer program, the program including instructions that when executed by data processing apparatus cause the data processing apparatus to perform operations. The operations include storing parameters in one or more configuration tables, the parameters being customized for a network and an application, instantiating a network adapter customized for the network and the application by invoking a generic network adapter which externally references the one or more configuration tables, and effecting communication between the application and the network using the instantiated network adapter.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 7 and 8 depict sample user interfaces that includes a configuration table and a table selection window for selecting a specific configuration table for editing.

FIGS. 11 to 14 show other examples of configuration tables that may be used by the network adapter framework.

In the various drawings, like reference numbers represent corresponding parts throughout.

DETAILED DESCRIPTION

According to the enhanced network adapter framework described herein, a generic network adapter includes external references within its code to parameter tables. Custom network adapters, such as network adapters used with the TELCORDIA® ACTIVATOR or other applications, may be created by adjusting the parameter tables using, for example, a SQL editor (e.g., TOAD, PL/SQL Developer, etc.), a straightforward table or text editor, or any other editor. In doing so, little or no revision of actual software, such as JAVA code, is required, reducing the need to store and maintain multiple different software components (e.g., JAVA components or other software components) for each particular network configuration. While this specification and the drawings provide examples using JAVA, JAVA EE and other specific software languages, any suitable software and/or software languages can be used.

Among others, the parameter tables may include a first parameter table which maps each service to multiple commands required to implement that service; a second table which, using regular expressions, maps messages returned from the network to unique message identifiers; a third table which determines command outcomes based on the unique message identifier and the input command; and a fourth table which includes an XML template for each command outcome which is used to generate response messages that may be communicated to the application. In some implementations, the XML is generated after some or all of the commands associated with the service have executed.

Figure 1:
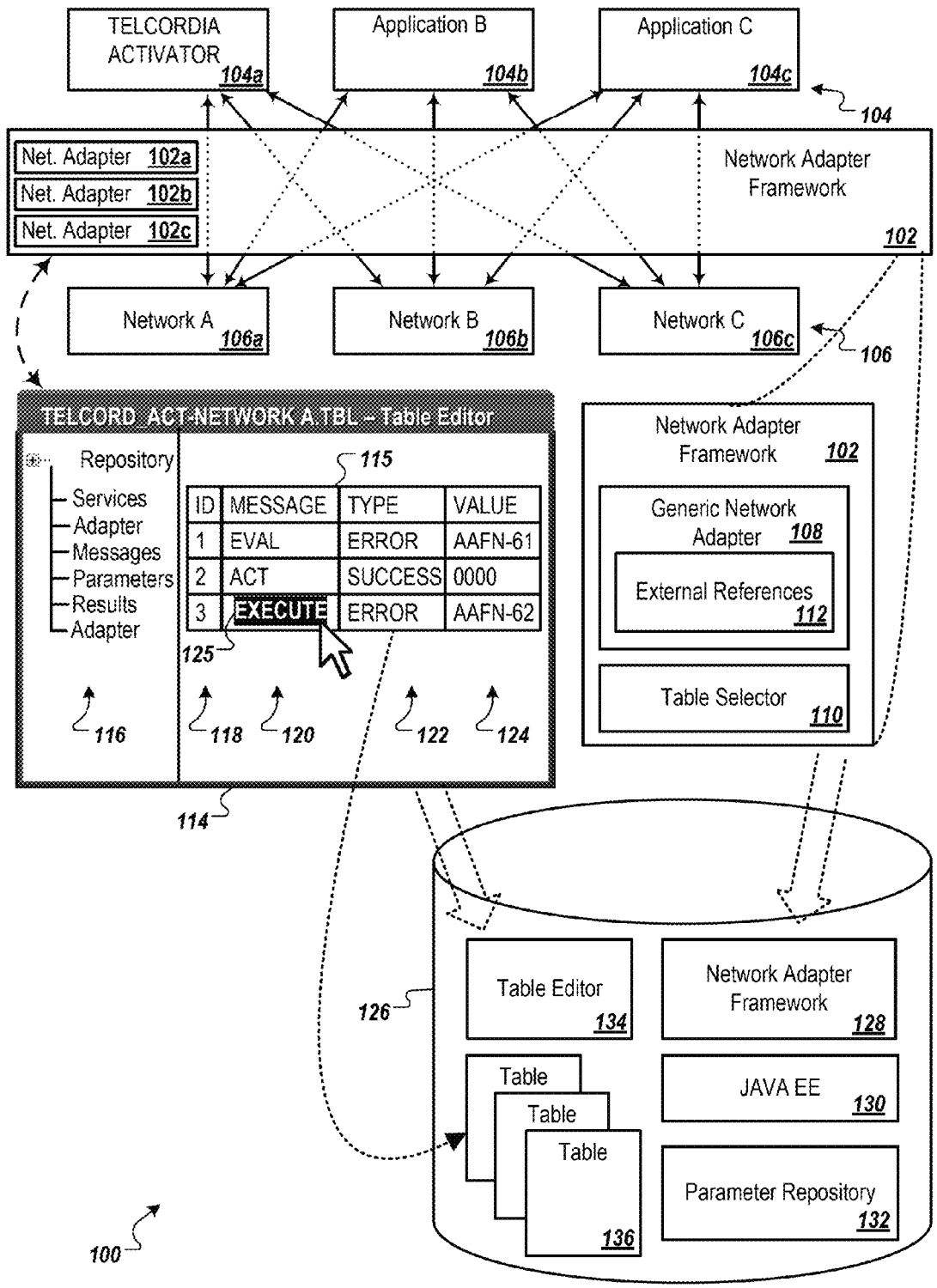
FIG. 1 illustrates a contextual diagram demonstrating a system for creating network adapters using a network adapter framework.

FIG. 1 is a contextual diagram of an exemplary system 100 for creating network adapters using a network adapter framework 102. Network adapters created using the system 100 provide network communications between applications 104 and networks 106. For example, the applications 104, as depicted, may include a TELCORDIA® ACTIVATOR application 104a, a second application (which may be, for example, a TELCORDIA® GRANITE INVENTORY application) 104b, and a third application 104c. The networks 106 include networks 106a, 106b and 106c. The system 100 may be used to create a network adapter or any other hardware or software component constructed and adapted to allow computers to communicate over a computer network, such as a network card, a local area network (LAN) adapter, or a network interface card (NIC).

The system 100, using the network adapter framework 102, creates or "instantiates" network adapters that effect communication between the applications 104 and the networks 106. For example, a particular network adapter may be used for communication between the TELCORDIA® ACTIVATOR application 104a and the network 106a. Other network adapters may support communications between the applications 104b-c and the network 106c, between the TELCORDIA® ACTIVATOR application 104a and the network 106c or between combinations of other applications and networks, whether depicted in FIG. 1 or not. "Instantiating" network adapters refers to the creation of a customized network adapter by invoking a generic network adapter which externally references a configuration table. The configuration table, which is described in more detail later, stores data that may be used to customize a network adapter for a particular network 106 and application 104. For example, for each type of device (e.g., Huawei, ZTE, Alcatel, etc.) there may exist one or more adapters using the framework. When the Activator requests to execute a service (e.g., Create, Delete, etc.), it may verify the kind of device, setting the identifier for the correct adapter in the XML request. For instance, if a CREATE request is generated for a ZTE device, the Activator may generate an XML request for the corresponding adapter and post it in the queue.

In some implementations, verifying the type of device and setting the identifier for the correct adapter in the XML request can include the following. When the TELCORDIA® ACTIVATOR needs to send a request for the adapter, it can read one or more configuration tables that identify the corresponding network adapter that has to be used to execute the automatic configuration for a particular network element. For example, the configuration tables can be database tables of the TELCORDIA® GRANITE INVENTORY application. In some implementations, a queue can exist that contains instances or entries, each of which is exclusive to a specific adapter. The entry can be, for example, a message driven bean (MDB) entry for that adapter. As such, each MDB entry can serve as a consumer for that adapter in the queue. In any particular activator request, the identifier of the adapter (e.g., a parameter in the message that identifies its "MDB consumer") is unique so that each MDB entry is associated with its correct requests.

The network adapter framework 102 includes a generic network adapter 108 and a table selector 110. The generic network adapter 108 is operable to adapt an existing generic network adapter definition in order to instantiate a new network adapter for a particular application 104 and network 106. For example, if the network adapter framework 102 is being used to create a network adapter for communication between the TELCORDIA® ACTIVATOR application 104a and the network 106a, the generic network adapter 108 may be used to select a generic network adapter that is suitable (e.g., most closely matching) to instantiate the specific network adapter needed. The network adapter framework 102 may also use the table selector 110 to select and access tables including configuration parameters used for instantiating a network adapter to the specifications needed for a particular application 104 and network 106. The generic network adapter 108 includes external references 112 that are used to obtain specific parameters from configuration tables.

The network adapter framework 102 may include one or more user interfaces that may be used in defining new network adapters. For example, as depicted, the network adapter framework 102 includes a table editor interface 114, which may be part of a set of several screens on a computer terminal or other interface for defining new network adapters. Similar interfaces 114 may exist to modify existing network adapters.

The table editor interface 114 includes a repository list 116. For example, the user who is using the table editor interface 114 to define network adapters may select one of the entries (e.g., Services, Adapter, Messages, Parameters, Adapter, Results, etc.) from the repository list 116. Some implementations of the table editor interface 114 may allow the user to select tables in various ways. Depending on the user's selection, a corresponding parameter table 115 may be displayed within the table editor interface 114. As depicted, the parameter table 115 includes an ID column 118, a message column 120, a type column 122, and a value column 124. The user, while using the table editor 114 to define a network adapter for a specific application 104 and network 106, may enter or modify values (e.g., AAFN-62) for an entry in the table, such as "execute" entry 125 having a type 122 of "Error."

In some implementations, the table editor interface 114 may automatically detect the type of the network and the application for which a network adapter is being defined. Using this information, the table editor interface 114 may automatically select the configuration table from among a group or list of configuration tables based on the detected type of the network and the application.

The system 100 includes data stored on a computer-readable medium 126, where the data is used by the network adapter framework 102 and the table editor interface 114 for creating network adapters (e.g., network adapters 102a-102c) of the network adapter framework 102. The data includes network adapter framework data 128, Java Platform Enterprise Edition (JAVA EE) code and run-time libraries 130, a parameter repository 132, a table editor 134, and data tables 136. The network adapter framework data 128 may include the code and data that support the execution of the computer software that makes up the network adapter framework 102. The tables 136 contain general fields associated with generic network adapter types. For example, one or more of the tables 136 may represent generic network adapters comprising JAVA EE-based network adapter information. Each of the tables 136 may be accessed by the table editor interface 114. The parameter repository 132 includes parameters that may be used to customize general fields of the tables 136 that represent generic network adapters when creating (or instantiating) new network adapters. While this specification and the drawings provide examples using JAVA, JAVA EE and other specific software languages, any suitable software and/or software languages can be used.

Parameters in the parameter repository 132 may include, for example, parameters corresponding to commands capable of being sent from the application 104 to the network 106, or responses to the commands capable of being sent from the network 106 to the application 104. In some implementations, the parameter repository 132 may include parameters used, for example, as values for rules that implement process flows.

In some implementations, the parameter repository 132 may include parameters associated with or that define actions associated with a loopback mode, a network emulator mode, and/or a network mode. In some implementations, the parameter repository 132 may include parameters associated with service definitions.

Figure 2:
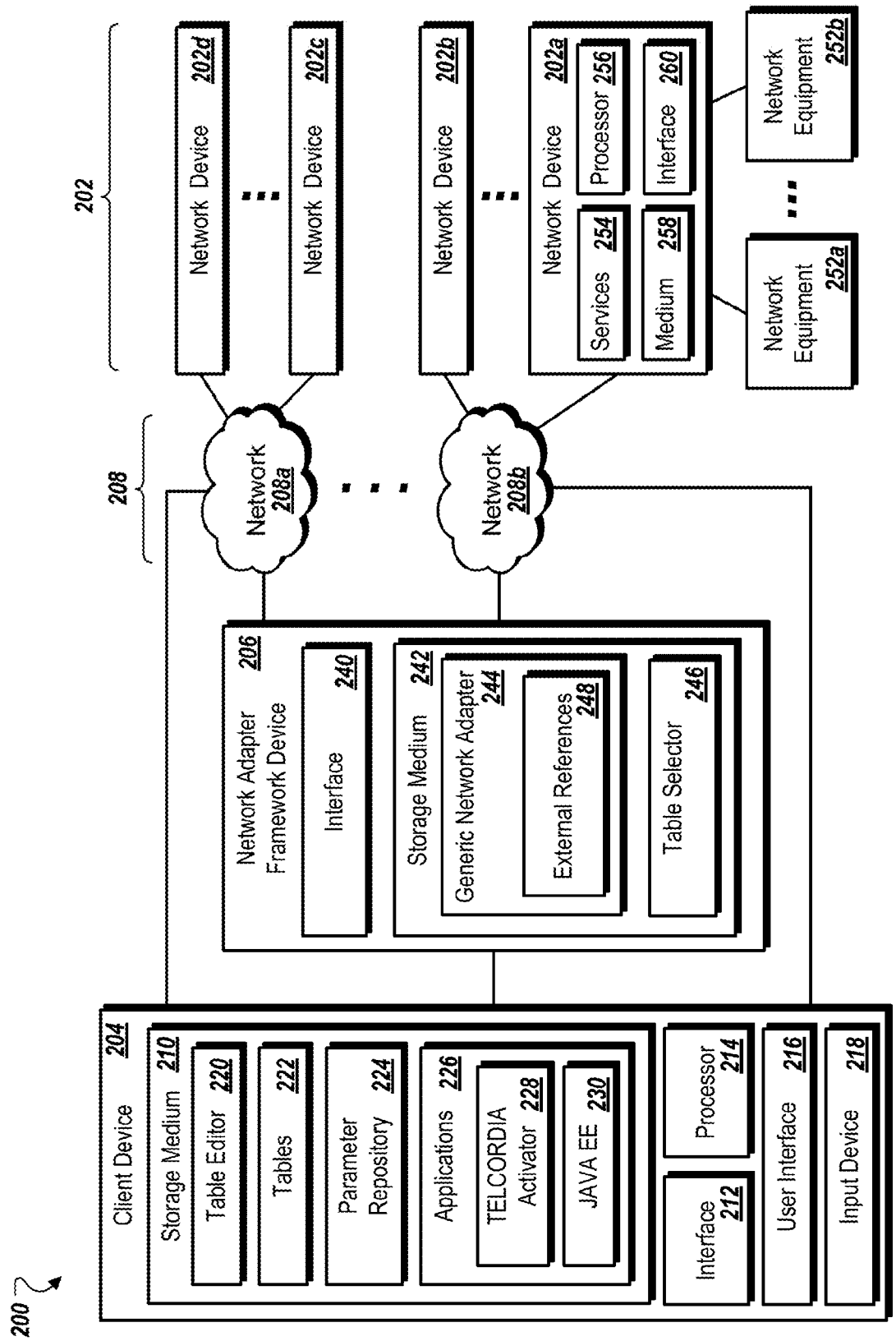
FIG. 2 is a contextual diagram demonstrating a system for adapting network devices using a client device and a network adapter framework device.

FIG. 2 is a contextual diagram demonstrating a system 200 for adapting network devices 202 using a client device 204 and a network adapter framework device 206. The client device 204 and the network adapter framework device 206 may be implemented in a single device that performs both functions. The system 200 may be used for network frameworks adapted by the system 100 or other systems. The network devices 202 include network devices 202a through 202d. The devices 204 and 206 may communicate with each other and with the network devices 202 using one or more networks 208. Any of the networks 208, such as networks 208a and 208b, may be the Internet, a local area network (LAN), a wide area network (WAN), a wireless network, a phone line, or other wired network, etc.

As depicted in FIG. 2, the client device 204 includes a storage medium 210, an interface 212, a processor 214, a user interface 216 and an input device 218. The storage medium 210 may store any of the data used for defining and/or configuring network adapters. The interface 212 may handle communications between the client device 204 and the network adapter framework device 206. The processor 214 may perform the computer processing that the client device 204 uses to manage network adapters. The user interface 216 may provide the software interface that a user (e.g., a DSL provider technician, cable provider customer service representative, or other user) may use to interact with, and/or manage data for, the network adapter framework applications. For example, the user interface 216 may include displays, menus, input fields, a graphical user interface, summaries, lists, etc. The input device 218 may include one or more keyboards, a mouse, switches, buttons, or any other controls that the user may employ to interact with the network adapter framework applications, hardware, and firmware.

The storage medium 210 includes a table editor 220, tables 222, a parameter repository 224, and applications 226. The table editor 220 includes the parameters and data used for presenting data tables to the user for display and update. The tables 222 include the network adapter data, such as relational database management system (RDBMS) tables (e.g., MS SQL server, DB2, Oracle, and MySQL) and/or flat files defining the fields and values used in defining and configuring network adapters. The parameter repository 224 includes parameters that may be used to customize generic tables when creating (or instantiating) new network adapters. The applications 226 may include one or more TELCORDIA Activator applications 228, JAVA EE 230 language and runtime environments, and any other applications used for communicating with or configuring networks. For example, the TELCORDIA Activator applications 228 may include any combination of TELCORDIA® ACTIVATOR and/or other applications.

As depicted, the network adapter framework device 206 includes an interface 240 and storage medium 242. The interface 240 may handle communications between the client device 204 and the network adapter framework device 206. The interface 240 may also handle communications between the network adapter framework device 206 and the network devices 202. The storage medium 242 includes a generic network adapter 244 and a table selector 246. The generic network adapter 244 is operable to adapt an existing generic network adapter definition in order to instantiate a new network adapter for a particular application 226 and network device 202.

For example, if the network adapter framework device 206 is being used to create a network adapter for communication between the TELCORDIA® ACTIVATOR application 228 and the network device 202a, the generic network adapter 244 may be used to select a generic network adapter that is suitable (e.g., most closely matching) to instantiate the specific network adapter needed. The network adapter framework device 206 may also use the table selector 246 to select and access tables containing configuration parameters used for instantiating a network adapter to the specifications needed for a particular application 226 and network device 202. The generic network adapter 244 includes external references 248 that are used to obtain specific parameters from configuration tables, such as from remote locations through the Internet. For example, for each type of device (e.g., Huawei, ZTE, Alcatel, etc.) there may exist one or more adapters using the framework. When the Activator requests to execute a service (e.g., Create, Delete, etc.), it may verify the kind of device, setting the identifier for the correct adapter in the XML request. For instance, if a CREATE request is generated for a ZTE device, the Activator may generate an XML request for the corresponding adapter and post it in the queue.

As depicted, the network device 202a includes services 254, a processor 256, storage medium 258, and an interface 260. The services 254 may include commands and parameters for establishing network services (e.g., DSL provisioning services, cable provider services, etc.) on the network device 202a, such as connecting or configuring DSL, changing DSL settings (e.g., transfer rates, etc.) or disconnecting DSL services. The processor 256 may perform the computer processing that the network device 202a uses to provide services. The medium 258 may store the data needed for execution by the network device 202a. The interface 260 may handle communications between the network device 202a and various network equipment 252a-252b. For example, equipment 252a-252b may include DSL modems, gateways, or other hardware or equipment that provides or import services.

Figure 3:
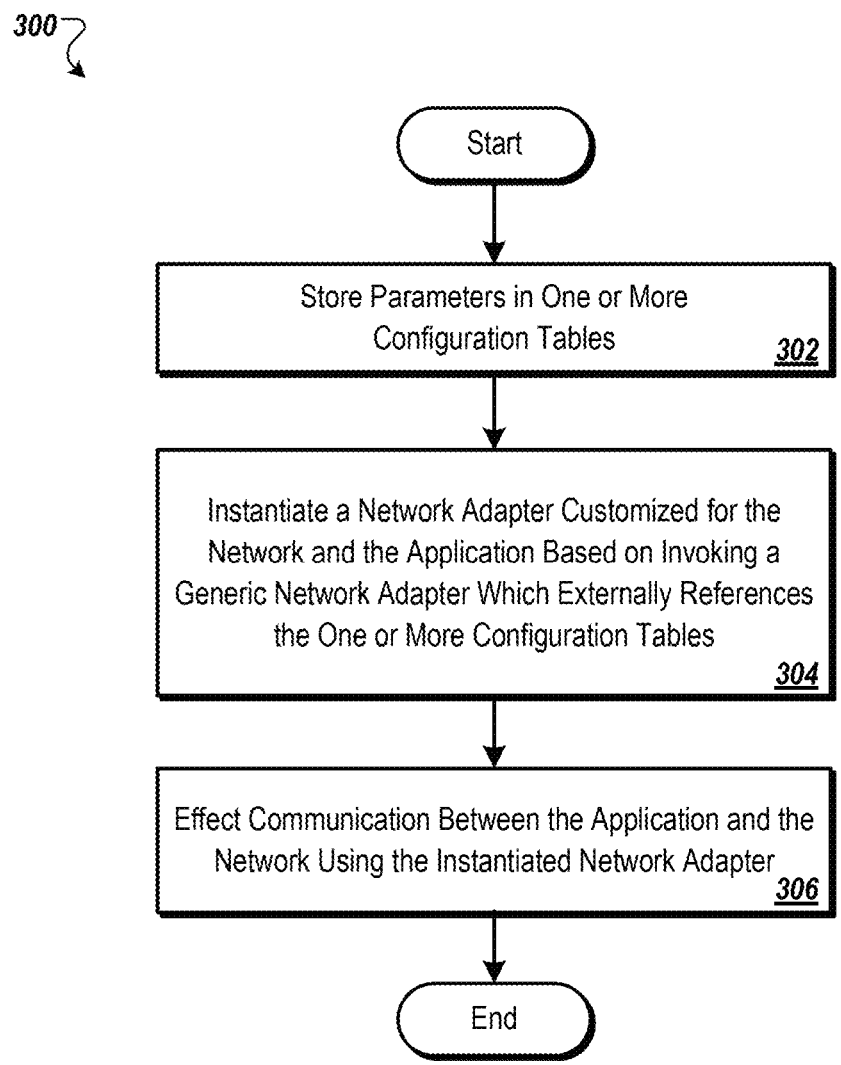
FIG. 3 is a flowchart illustrating an example process for creating network adapters using a network adapter framework.

FIG. 3 is a flowchart illustrating an example process 300 for creating network adapters using a network adapter framework. For example, the process 300 may be a computer-implemented method used within the network adapter frameworks of systems 100 and 200. Briefly, the process includes storing parameters in one or more configuration tables, the parameters being customized for a network and an application, and instantiating a network adapter customized for the network and the application by invoking a generic network adapter which externally references the one or more configuration tables. The process also includes effecting communication between the application and the network using the instantiated network adapter.

In more detail, when the process 300 begins, parameters are stored in one or more configuration tables (operation 302). The parameters are customized for a network and an application. For example, referring to FIG. 2, a set of parameters, stored in the parameter repository 224, may be used by the network adapter framework device 206 to create network adapters on the network devices 202a or any of the other network devices 202. The parameters may define commands and services that may be used for creating customized network adapters. The parameters may also include numeric settings used by applications, such as TELCORIDA® ACTIVATOR, to create network adapters. The parameters may further include status and message information associated with executing the commands and services. For example, referring to FIG. 1, the parameter table 115 includes the ID column 118, the message column 120, the type column 122, and the value column 124, all of which may define messages associated with specific commands and services. In some implementations, the adapter may read the configuration data (stored in the tables or a database) prior to starting the adapter in the server (e.g., deployed the generic network adapter 244).

A network adapter is instantiated that is customized for the network and the application (operation 304). The instantiation is based on invoking a generic network adapter which externally references the one or more configuration tables. For example, referring to FIG. 1, the network adapter framework 102 may use tables such as table 115 to create a customized network adapter for any of the networks 106a through 106c. The customized network adapter created is device- and application-specific. For example, the device specificity may depend on the particular hardware device (e.g., a specific DSL modem or other piece of hardware). The application specificity may depend on the specific application 104 being executed, e.g., the TELCORDIA® ACTIVATOR application 104a, the TELCORDIA® GRANITE INVENTORY application 104b, or any other generic application 104c.

Communication is effected between the application and the network using the instantiated network adapter (operation 306), thereby ending process 300. For example, using the newly-instantiated network adapter, the specific application 104 may communicate with the specific network 106 for which the network adapter was created and customized.

Figure 4:
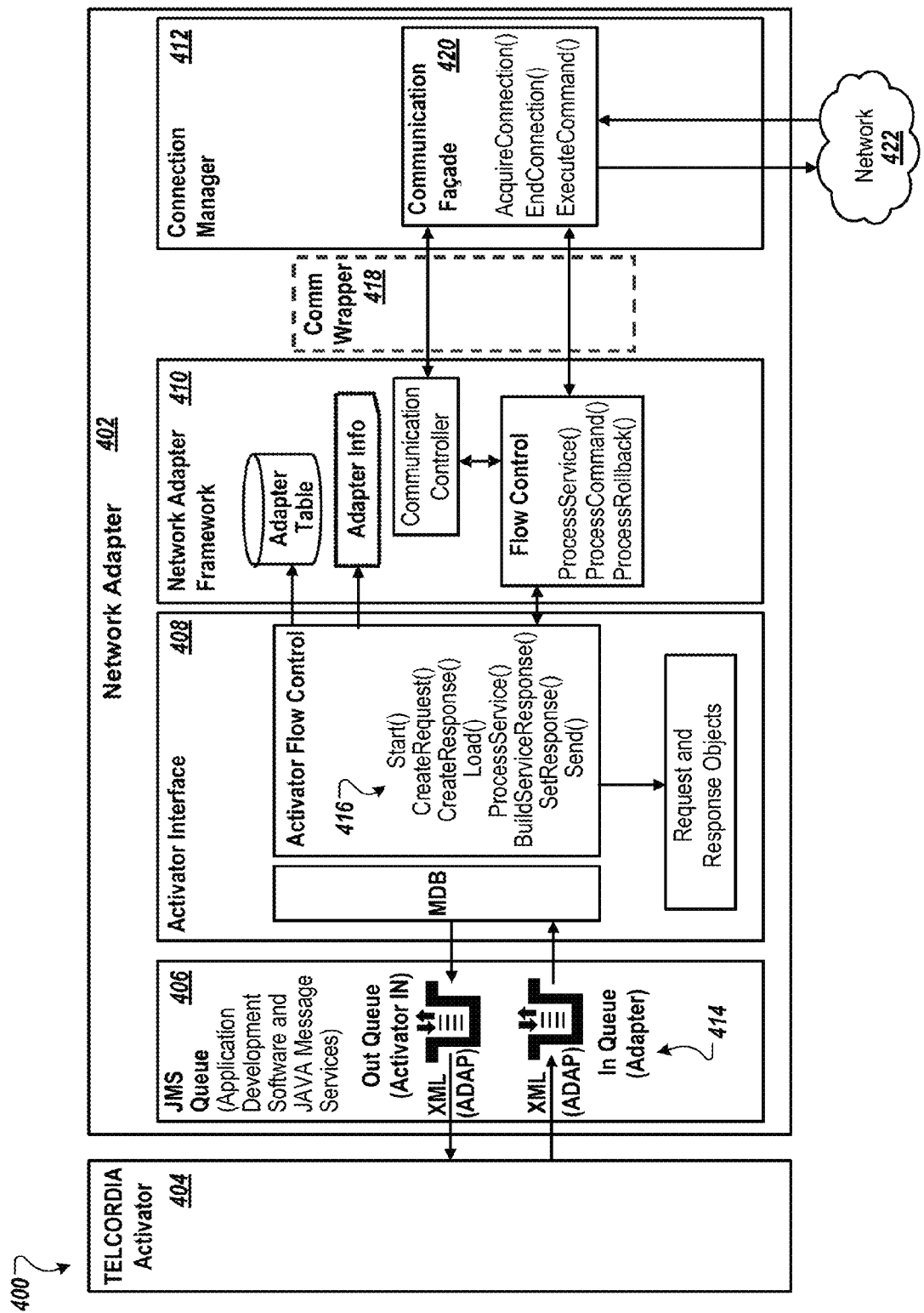
FIGS. 4 to 6 are block diagrams of exemplary network adapter framework architectures.

FIG. 4 is a block diagram of an exemplary architecture 400 for providing a network adapter framework. For example, the architecture 400 may be used for the systems 100 and 200. The architecture 400 may facilitate the creation of a network adapter 402 by any network adapter application, such as a TELCORDIA® ACTIVATOR application 404.

The network adapter 402 includes application development software and a middleware or other messaging service, such as a JAVA message services (JMS) 406, an activator interface 408, several configuration tables and protocols in a network adapter framework 410, and a connection manager 412. The network adapter 402 may be configured, for example, to handle Transaction Language 1 (TL1) protocols or other telecommunications protocols for DSL Access Multiplexer (DSLAM) scope. Using configuration tables may provide the advantage of flexibility, for example, through the use of regular expressions to analyze network commands, parameters and responses. Configuration table information (e.g., commands, messages, rules, regular expressions, etc.) used by the network adapter framework 410 may allow network adapters to be created without changing code in applications such as the TELCORDIA® ACTIVATOR application 404.

In some implementations, the TELCORDIA® ACTIVATOR application 404 may interface with the network adapter 402 using eXtensible Markup Language (XML) commands and responses 414. The XML commands and responses 414 may be managed using queues or other processes for managing messages, commands and communications. For example, an input queue may handle service requests (e.g., activate DSL, cancel DSL, etc.) that are issued by the TELCORDIA® ACTIVATOR application 404.

XML commands and responses 414 may be handled by the application development software and JMS Queue interface 406 and sent to (or received from) the activator interface 408. For example, the activator interface 408 may include activator flow commands 416 that may be used to execute the services requested by the TELCORDIA® ACTIVATOR application 404. Similarly, responses that result from executing the commands may be sent by the activator interface 408 to an output queue managed by the application development software and JMS interface 406.

The network adapter framework 410 may include protocols, adapter tables and information, flow control commands (e.g., process a service, rollback a command if a service fails, etc.) and a communication controller. The network adapter framework 410 may communicate with the connection manager 412 through a communication wrapper 418. The connection manager 412 may communicate with network devices and equipment (e.g., DSL modems or other equipment) using a communication façade 420. The communication may occur over a network 422, such as the Internet, a local area network (LAN), a wide area network (WAN), a wireless network, a phone line or other wired network, etc. In some implementations, the protocols included by the network adapter framework 410 can be standardized protocols such as Common Object Requesting Broker Architecture (CORBA), Common Management Information Protocol (CMIP), Transaction Language 1 (TL1), or other communications protocols, etc.

Figure 5:
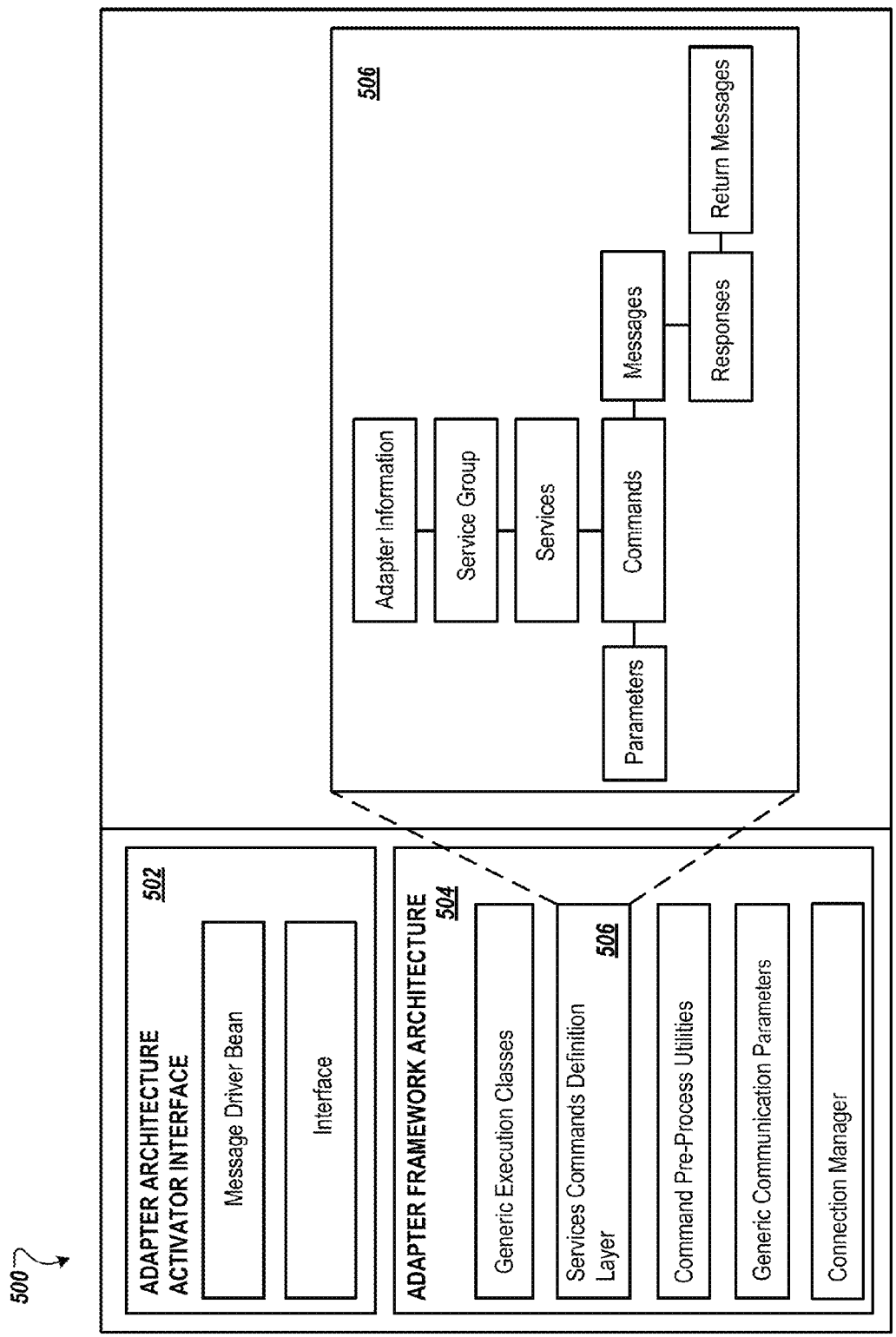

FIG. 5 is a block diagram of another exemplary architecture 500 for a network adapter framework. For example, the architecture 500 may be used within the systems 100 and 200. The architecture 500 includes an adapter architecture activator interface 502 and an adapter framework architecture 504. The adapter architecture activator interface 502 may include a message driver bean for handling messages and an interface for communicating with the adapter framework.

The adapter framework architecture 504 includes generic execution classes, a services commands definition layer 506, command pre-process utilities, generic communication parameters, and a connection manager. The services commands definition layer 506 may include adapter information, service group information, services, commands, parameters, messages, responses and return messages. These components of the services commands definition layer 506 may be organized, for example, in a series of configuration tables for use in creating customized network adapters for specific application and network devices.

In some implementations, generic execution classes can include Java classes that implement the common logic to process the requests. For example, the Java classes can include: INTEGRA.ADAPTER.COMM.LOG, INTEGRA.ADAPTER.COMM.TL1.ERROR, INTEGRA.ADAPTER.COMM.TL1.ERROR, INTEGRA.ADAPTER.CORE, INTEGRA.ADAPTER.FRWK.ADAPTERINTERFACE, INTEGRA.ADAPTER.FRWK-.BEAN, INTEGRA.ADAPTER.FRWK.COMM, INTEGRA.ADAPTER.FRWK.ERROR, INTEGRA.ADAPTER.FRWK.GADE, INTEGRA.ADAPTER.FRWK.LOG, INTEGRA-.ADAPTER.FRWK.UTIL, INTEGRA.ADAPTER.UTILS, other INTEGRA-.ADAPTER classes or subclasses, or other classes. The services commands definition layer 506 can, for example, enable services that are mapped to the instances of the corresponding adapters.

Command pre-process utilities can be composed mainly of macro class utilities, gathering the necessary features for the correct interpretation and compilation of GADE expressions. The macro class utilities can identify and separate the parts of the expressions themselves, such as the GADE part of the regular expression that is pure. At the time of compilation, these data can be organized internally to ensure better performance in processing the specific attributes of the GADE language.

Generic communication parameters can represent the layer of specific communication with the network through the design of the call and the concept of the command. This allows each command to run as an atomic unit, synchronously, as a request/response pair, driven by the interface defined. This interface, for example, can be implemented specifically for a session bean, providing features for managing connections and implementation of controls according to the needs of the network adapter framework. The main features defined by this interface can include: 1) requests for a connection independent of the technology used in communication with the network; 2) requests for command execution in the network standard; and 3) requests for the closure of the operation, allowing the release of the connection.

The connection manager can be responsible for managing the connections between and network adapters in order to provide connections on demand to the adapters. To initialize the connection manager, a set of connections can be created (e.g., to initiate the request for connection) and be available to the requests of adapters. Each connection request can be used, then returned to the connection manager (e.g., to be used in another request, if necessary).

In some implementations, (e.g., in a loopback mode or if the network emulator is active), the command may not be sent via the network. Instead, the answer can be obtained from a configuration file.

In some implementations, for each adapter instance, there can be an instance of communication façade 420 and the communication connection handler.

In some implementations, a connection manager can exist for each network management system, such as to provide better availability in certain settings within the network. In this way, the failure of a single connection manager cannot cause the loss of access by all network management systems concerned. Moreover, having multiple connection managers can prevent loss of access when maintenance is programmed in, or scheduled for, a single connection manager.

In some implementations, examples of which are discussed in more detail below with respect to FIGS. 11-15, the services commands definition layer 506 may include rules associated with the services, mapped in several database tables. At start-up of the network adapter framework, for example, all of the information from the database tables may be loaded into virtual memory. Having one initial load of configuration data per execution may help to reduce database performance or access volume problems.

In some implementations, the services commands definition layer 506 may further provide: table-defined configuration of commands and command parameters; recursive command parameterization; command level retry parameterization tailored accordingly for each possible network return message; rollback mapping customized to the network return messages for each command executed; command flow mapping, including conditional rules; network result messages parameterization, mapping and classification; parameterization of network exception handling rules; and command specific timeout parameterization.

Figure 6:
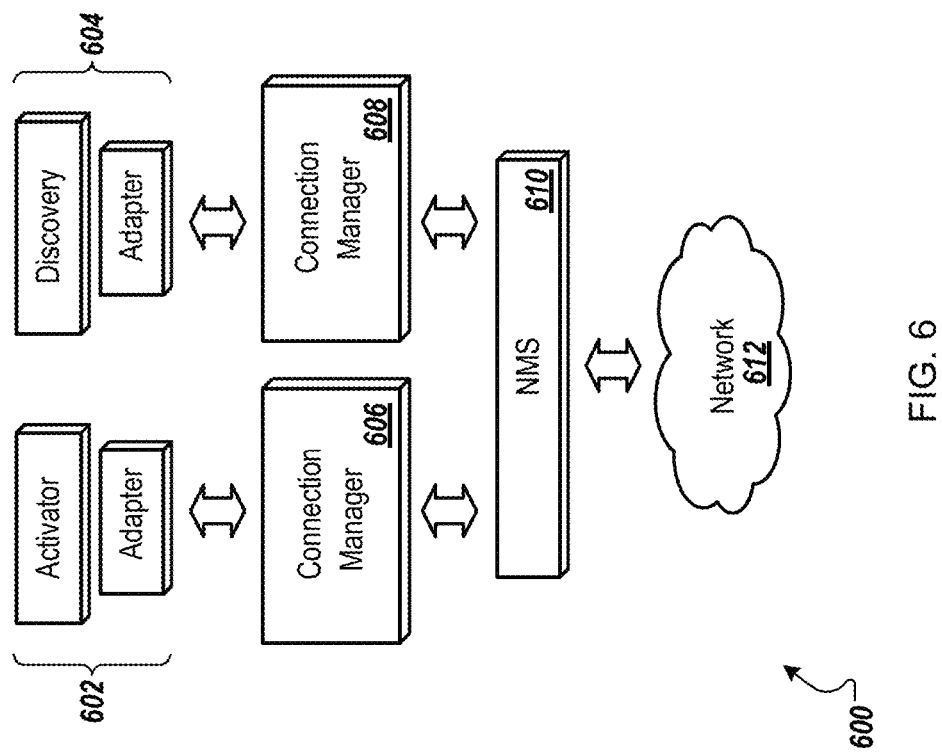

FIG. 6 is a block diagram demonstrating another exemplary architecture 600 for a network adapter framework. For example, the architecture 600 may be used for the systems 100 and 200. The architecture 600 includes an activator adapter 602, a discovery adapter 604, an adapter connection manager 606, a discovery connection manager 608, a network management system (NMS) 610, and a network 612.

The activator adapter 602 and the discovery adapter 604 can be used by the framework to connect and send the commands to the network through the connection manager. The adapter connection manager 606 and the discovery connection manager 608 can include and/or use applications that send and receive commands to and from the adapter. In some implementations, the connection managers 606 and 608 may not handle the activation rules, but rather the managers 606 and 608 may operate by receiving commands that are to be sent through the network (e.g., via the NMS 610). The NMS 610 can be responsible for controlling and managing the commands, such as configuration commands and system commands, and for sending the commands to the network elements. The NMS 610 can be a part of the network, but in some implementations may be optional.

The activator adapter 602 and the discovery adapter 604 can be different types of systems. For example, the activator adapter 602 can be a TELCORDIA® system that automatically configures the network. The discovery adapter 604 can be, for example, a TELCORDIA® system that automatically discovers or determines the configuration of the network elements in the network. Both adapters 602 and 604 can send commands and handle responses, but with different business or technical objectives.

Figure 7:
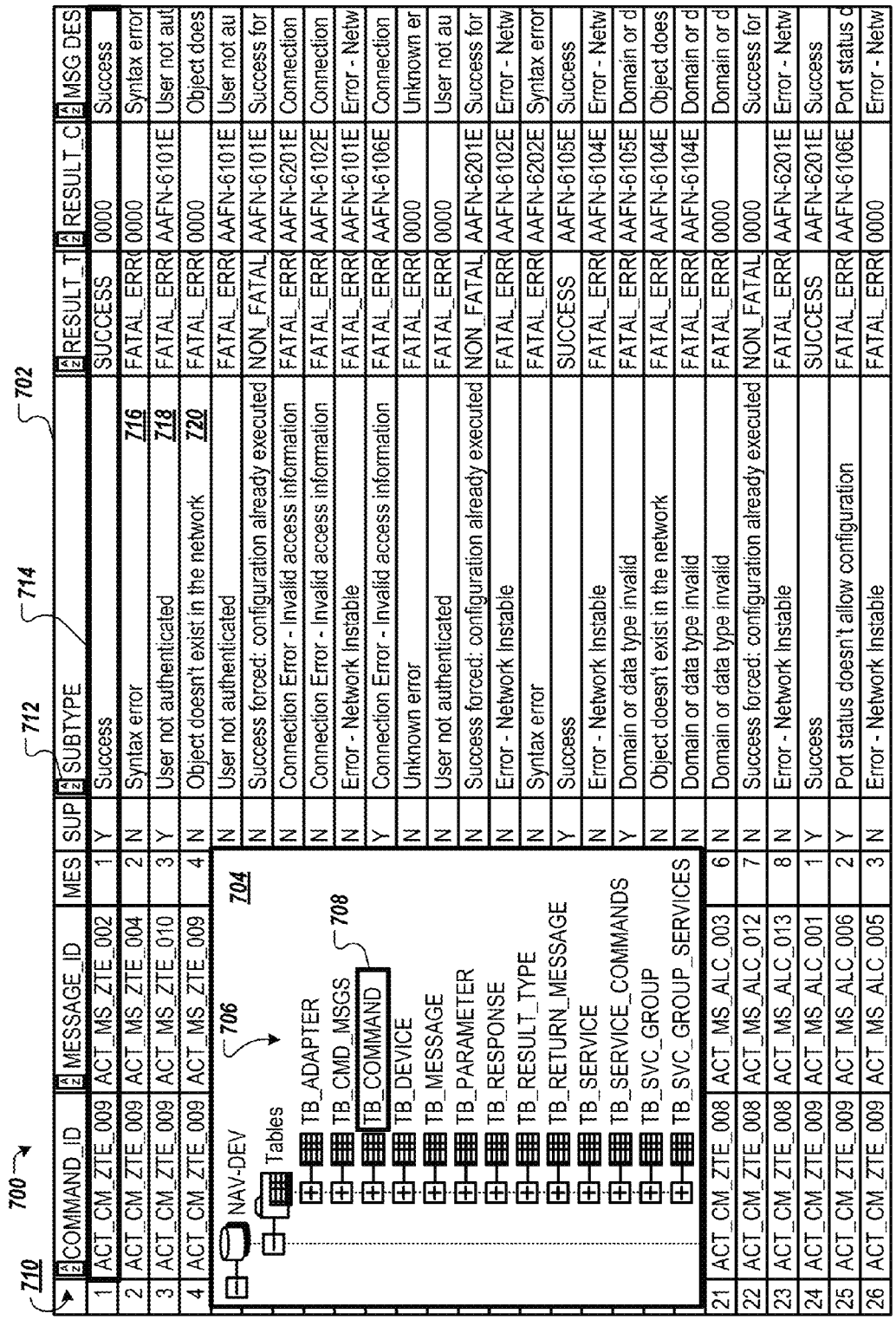

FIG. 7 shows a sample user interface 700 that includes a configuration table 702 and a table selection window 704 for selecting a specific configuration table for editing. For example, using applications that are invoked as part of a network adapter framework (e.g., of systems 100 and 200), the user may select from a table list 706 for editing. In some implementations, the tables listed in the table list 706 may all have a common prefix (e.g., "TB_") indicating that the entries in the list are table names. Other non-table entities that appear in other lists may have other prefixes if they are not tables, such as parameters, variables, or other entities.

In one example using the user interface 700, if the user selects the command table entry 708 (e.g., "TB_COMMAND") from the table list 706, the configuration table 702 may be displayed. In this case, the configuration table 702 may contain information related to network adapter commands, including column headings 710 for the command ID, a message ID, a message number, a suppress rollback flag, a message subtype, a message result type, a message result code, and a message description.

In some implementations, controls may exist for optimizing or reorganizing the display of information. For example, sort controls 712 or other controls may allow the user to arrange the information in a more convenient way (e.g., sorted by message subtype, etc.).

A row 714 in the sample configuration table 702 may contain all of the fields associated with that entry. As depicted, the row 714 that is highlighted lists a value of "ACT_CM_ZTE_009" for the command ID, "ACT_MS_ZTE_002" for the message ID, "Success" for the message subtype, and so on. As is the case for the sample configuration table 700 and other configuration tables described herein, multiple rows may have common values for some of the columns or fields. For example, rows 716, 718 and 720 each list "ACT_CM_ZTE_009" for the command ID, but each has a different message ID.

In some implementations, highlighting a row (e.g., the row 714) in a configuration table may allow the user to edit fields in the row, such as the way that some common spreadsheet applications function. In some implementations, highlighting a row may cause one or more windows, pop-ups or screens to appear in which the user may add, modify or delete information. Other user interface 700 controls and capabilities may also exist, such as mouse selection and dragging, right button commands, radio buttons, checkboxes, or any other controls that are common in graphical user interfaces (GUIs). In some implementations, a SQL editor (e.g., TOAD, PL/SQL Developer, etc.) may be used to modify data in the configuration table 700.

FIG. 8 shows another sample user interface 800 that includes a sample configuration table 802 and a data editing window 804 for editing data (e.g., command information) for a specific entry in the configuration table 802. For example, the configuration table 802 may be displayed for editing command information if the user selects the command table entry 708 from the table list 706. Moreover, the data editing window 804 may be displayed when the user selects a specific row or cell in the configuration table 802.

For example, a first row 806 is selected in the configuration table 802 as indicated by bolding around the row. As a result, the data editing window 804 contains the current values of data elements associated with the row 806. For instance, a value entry box 808 contains the current value (e.g., "LOGIN:::<INSERT_CTAG_HERE> . . . ") corresponding to a cell 810 in the "command expression" column 812 for that row 806. The row 806, as depicted, represents the information for a command having "ACT_CM_HUA_001" as the command ID, "LOGIN HUAWEI" as the command description, "LOGIN:::<INSERT_CTAG_HERE>..." as the command expression, and 5000 as the timeout threshold (e.g., how many milliseconds to wait for the command to execute before raising a timeout exception or error).

In some implementations, components of the command description surrounded by special characters, such as "<" and ">" in "<INSERT_CTAG_HERE>" may be a signal to the network adapter framework to substitute an actual value or parameter into the command expression. Parameters may be stored, for example, in other configuration tables not described herein.

The user interface 802 may include multiple data entry fields, such as a line terminator field 814 having "Platform Default" as the current value 816. The user interface 800 may include buttons or other controls, such as a change button 818 that may allow the user to modify the value of the line terminator field 814 or other fields. Additional controls 820 may exist that allow the user to add rows in the configuration table 802, to verify a change (e.g., using an "OK" button), or to cancel a change. The user interface 802 may also include other controls, such as a horizontal slider bar 822 and a vertical slider bar 824 that may be used, for example, for controlling the position of the display in the value entry box 808.

In some implementations, user interfaces employed in the network adapter framework may have hot-key or other shortcuts for selecting options, etc. For example, the line terminator field 814 and other fields may have an underlined character (e.g., "T" in "Terminator") that indicates that a Alt-T, Ctrl-T or other key sequence may also be used to select the option.

Figure 9:
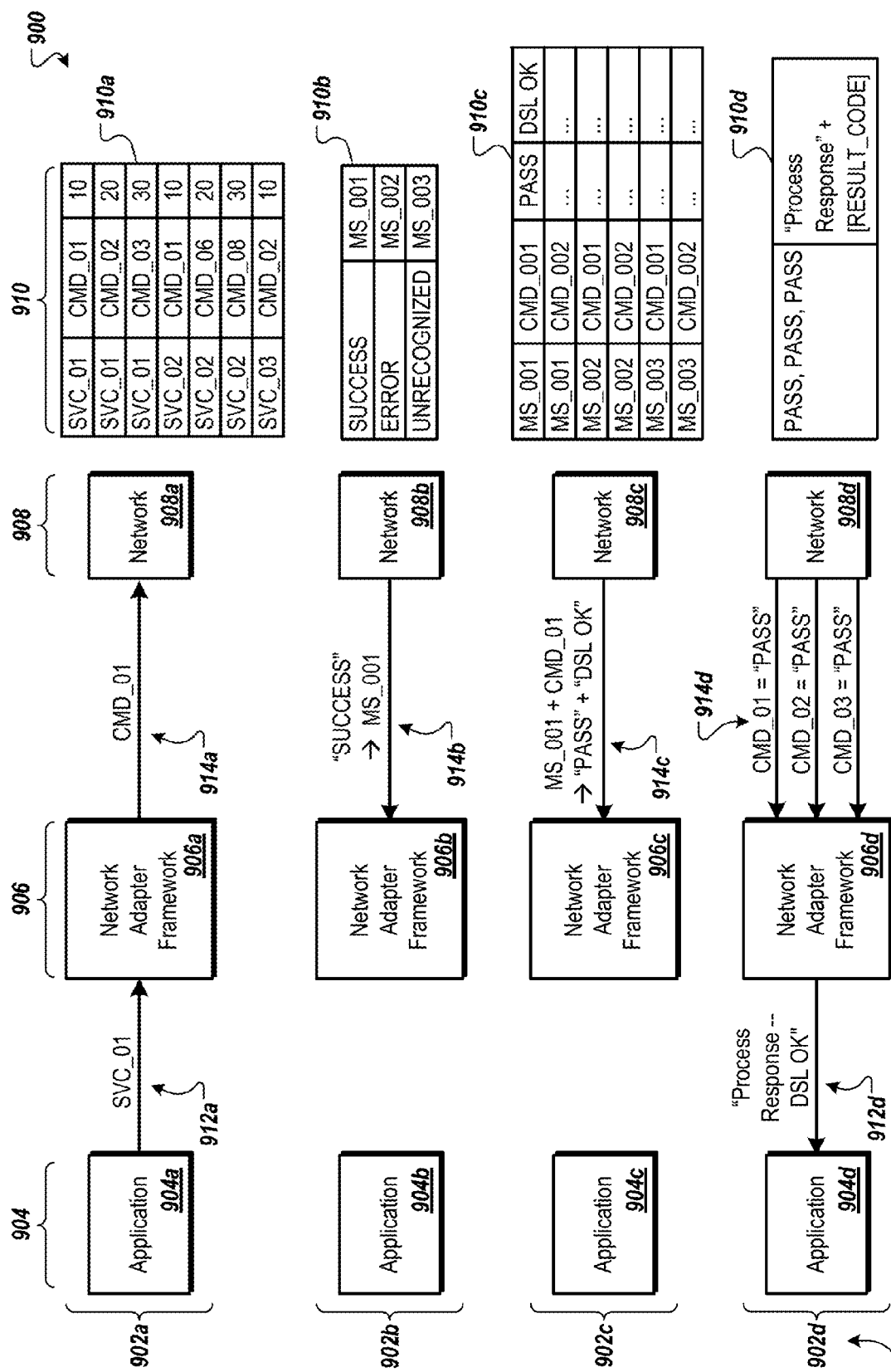
FIG. 9 is a contextual state diagram demonstrating states during execution of commands that are executed to create a network adapter.

FIG. 9 is a contextual state diagram 900 demonstrating the use of a customized network adapter created with the enhanced network adapter framework, in various states. Specifically, the states 902a through 902c pertain to the use of regular expressions, and the state 902d pertains to the automatic generation of XML commands during use of the network adapter framework.

The states 902a through 902c effect communication between the application and the network using the instantiated network adapter. The states 902a through 902c involve receiving a request from the application to perform a service on the network and identifying a sequence of commands associated. The commands are transmitted in sequence, each resulting in a response that is received. For each response, regular expressions may be executed to deterministically determine an outcome for the command. The regular expressions are based upon unique message identifiers and/or patterns of messages.

The state 902d also effects communication between the application and the network using the instantiated network adapter. However, the end result of the state 902d is to provide an XML return message, populated with result values for each command in the sequence of commands associated with the service, to the application. The XML return message may include GADE variables, which are substitution variables embedded in return messages. The GADE variables are replaced with actual values prior to transmission to the application, depending on various factors. For example, GADE variables may be based on referencing the outcome of the service and the one or more result values associated with the service. The GADE variables may also depend on entries in one or more parameter tables. The outcomes of all commands associated with the service may be used to determine the overall outcome of the service itself.

The states 902 involve communications between applications 904, network adapter frameworks 906 and networks 908. The processing and communications in each state depend on the corresponding configuration table 910 for that state. The configuration tables 910 shown here depict just enough rows and columns to support a description of the example states 902. In some implementations, additional columns may exist, providing more robust functionality (e.g., rollbacks, time-outs, etc.), and other rows may exist representing additional services, commands, messages, etc.

In FIG. 9, although the applications 904a through 904d are considered to be the same application, they are differentially labeled for ease of reference when describing the separate states 902. The same is true for the network adapter frameworks 906 and networks 908. Nevertheless, the states 902 may be used by any combination of applications 904, network adapter frameworks 906 and networks 908.

In the first state 902a, the application 904a identifies a service 912a (e.g., SVC_01) to be performed by the network adapter framework 906a. "SVC_01" identified by the service 912a is listed in the first column of the configuration table 910a. In this example, the configuration table 910a is a "service-command" table, identifying the commands and sequence of commands to be executed for any particular service (e.g., SVC_01). Examples of services represented by SVC_01 may include services for activating DSL, deactivating DSL, establishing satellite TV service, connecting or configuring in-home peripherals (e.g., digital video recorders or DVRs), etc.

The network adapter framework 906a uses the service 912a (e.g., SVC_01) identified by the application 904a to access the configuration table 910a, looking up the one or more commands corresponding to the service. In this case, the commands (e.g., CMD_01 through CMD_03) are stored in the second column of the configuration table 910a. In addition, the corresponding sequence orders (e.g., 10, 20, 30) of the commands are found in the third column of the configuration table 910a. Using the first command (e.g., CMD_01) obtained from the configuration table 910a, the network adapter framework 906a may send the first command 914a (e.g., "CMD_01") to the network 908a where the command is executed.

The remaining commands corresponding to the service may also be executed, in sequence, with each execution resulting in some kind of return status (e.g., "SUCCESS", "ERROR," "UNRECOGNIZED," etc.). In the current example, CMD_02, having a sequence of 20 would be executed after CMD_01 having a sequence of 10. The third and last command executed, CMD_03, has the highest sequence order of 30.

In the second state 902b, the network 908b generates a return status 914b (e.g., "SUCCESS"), that results from executing the command. The network adapter framework 906b may parse the return status 914b (e.g., "SUCCESS") and access the configuration table 910b to locate the matching table row that contains "SUCCESS". In this case, the message code that corresponds to "SUCCESS" in configuration table 910b is MS_001.

In some implementations, the second state 902b, including the configuration table 910b, may be implemented using regular expressions or any other formal language for defining and recognizing particular text strings of interest. Using regular expressions, for example, may allow predictable messages to be pre-loaded into a table, such as the configuration table 910b, for comparison with actual return messages received from network devices. This may provide a flexible and deterministic way for identifying text strings of interest, such as particular return or error messages, or patterns of words in messages.

In the third state 902c, the network adapter framework 906c combines the message code MS_001 with the command code CMD_01 to access the configuration table 910c. In this case, the configuration table 910c contains four visible columns, the first two providing the "key" or look-up indexes. The third column having the first-row entry "PASS" is a status field. The fourth and last column (e.g., with entry "DSL OK") is a result code field. As a result of accessing the configuration table 910c, the "MS_001+CMD_01" pair, for example, may result in looking up a return status 914c of "'PASS'+'DSL OK.'" The result code "DSL OK" may be passed to the application 904c at this stage, or may be used later to populate an XML response message.

In the fourth state 902d, the status results of a service's commands may be grouped together in order to generate a service-level result message. For example, as a result of receiving the service 912a (e.g., SVC_01) and executing the corresponding commands CMD_01, CMD_02 and CMD_03, the commands' status results 914d (e.g., PASS, PASS and PASS) may be combined to access the configuration table 910d. The first column in the configuration table 910d may contain all possible combinations of results of separate commands executed in sequence for a particular service. As depicted, the configuration table 910d contains one row or entry, but other tables may be, for example, "PASS, PASS, FAIL," "PASS, FAIL, N/A," etc. As a result of looking up the entry for "PASS, PASS, PASS", the entry in the table's second column (e.g., "Process Response"+[RESULT_CODE]) may be found, meaning that the "process response" is to be concatenated with the [RESULT_CODE] from the configuration table 910c. Upon making the substitution for the [RESULT_CODE], a service-level result 912d (e.g., "Process Response—DSL OK") may be generated and returned to the application 904d. The result 912d may be formatted as an XML return message.

Figure 10:
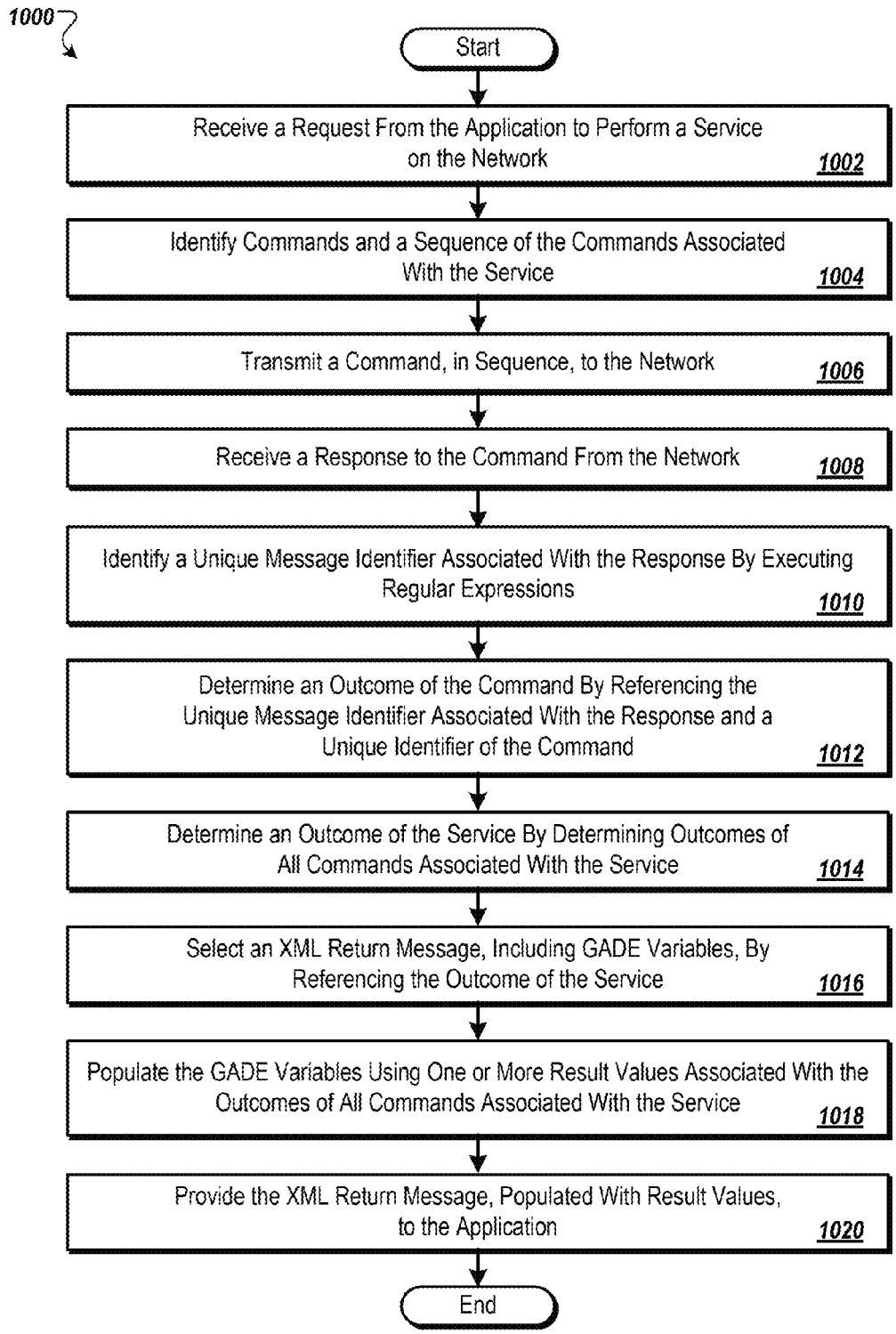
FIG. 10 is a flowchart illustrating an example process for effecting communication between the application and the network using an instantiated network adapter.

FIG. 10 is a flowchart illustrating an example process 1000 for effecting communication between the application and the network using an instantiated network adapter. The process 1000 may be used, for example, in combination with the process 300 described with regard to FIG. 3. For example, the process 1000 may be a computer-implemented method used within the network adapter frameworks of systems 100 and 200. Moreover, referring to FIG. 9, the process 1000 may be used to perform the processing described with regard to states 902a through 902c pertaining to regular expressions and state 902d pertaining to generating and providing XML return messages.

A request is received from the application to perform a service on the network (operation 1002). For example, referring to FIG. 2, the request may be a "Start DSL Service" service request issued by a user (i.e. cable provider customer service representative) of any of the TELCORDIA Activator applications 228. The client device 204 may send the service request to the network adapter framework device 206.

Commands and a sequence of the commands associated with the service are identified by referencing a unique identifier of the service for the client device in a first configuration table (operation 1004). For example, based on the "Start DSL Service" service request received from the client device 204, the network adapter framework device 206 may determine the individual commands needed to effect the service. The determination may be made, for example, by accessing tables 222 (e.g., the configuration table 910b or other such table), using the service code (e.g., SVC_01) to obtain the corresponding commands. The first configuration table lists the commands and sequence of commands to be executed for the unique identifier. In some implementations, unique identifiers can be determined in the same way that primary keys are selected for a database, such as at configuration time (e.g., commands such as database CREATE TABLE commands).

Commands are transmitted, in sequence, to the network (operation 1006). For example, the network adapter framework device 206 may transmit the commands, in sequence, to at least one of the network devices 202. In some implementations, if several network devices 202 of the same type are being configured with a network adapter, the commands may be transmitted to each network device 202, either serially or in parallel. In this way, it may be possible to create several network adapters at the same time. Transmission of commands to the network devices 202 may occur over the one or more networks 208.

A response to the command is received from the network (operation 1008). For example, based on the execution of the command on the particular network device 202, the network device 202 may transmit a response to the network adapter framework device 206. The response may be in the form of a text string or other message.

A unique message identifier associated with the response is identified by executing regular expressions listed in a second configuration table (operation 1010). For example, client device 204 may access one of the tables 222, such as a configuration table containing regular expressions, and generate a unique message identifier (e.g., MS_001) that is associated with the response (e.g., "SUCCESS"). If no matching message identifier can be determined, the client device 204 may use or generate a default message identifier.

An outcome of the command is determined by referencing the unique message identifier associated with the response and a unique identifier of the command in a third configuration table (operation 1012). For example, the service code (e.g., SVC_01) may be used in combination with the message identifier (e.g., MS_001) in order to determine the command's outcome.

An outcome of the service is determined by determining outcomes of all commands associated with the service (operation 1014). For example, if three commands are executed for the service, the outcomes of each of the commands are considered as a group in determining the outcome of the service itself. In one implementation, if the outcomes of the commands are PASS, PASS and PASS, the three outcomes may be combined to access a configuration table (e.g., configuration table 910d) to obtain, for example, a process response and a result code.

An XML return message is selected, including GADE variables, by referencing the outcome of the service in a fourth configuration table (operation 1016). For example, using the configuration table 910d or a similar table, the network framework may look up "Process Response"+[RESULT_CODE] using the PASS, PASS, PASS result of the service. In this example, [RESULT_CODE] may be a GADE variable.

The GADE variables are populated using one or more result values associated with the outcomes of all commands associated with the service (operation 1018). For example, using the [RESULT_CODE] GADE variable, the framework may populate the message with DSL OK.

The XML return message is provided, populated with result values, to the application (operation 1020). For example, the network adapter framework 906d may return the response 912d (e.g., "Process Response—DSL OK") to the application 904d.

FIGS. 11 to 14 show more detailed examples of configuration tables that may be used by the network adapter framework within each of the systems 100 and 200. Specifically, FIG. 11 shows an example service command table 1100. Each row or entry in the service command table 1100 may store, for each service ID 1102, command IDs 1104 of the commands used to perform the service, sequence numbers 1106, rollback services 1108, rollback enable indicators 1110, and conditional commands 1112. The service command table 1100 may be used for looking up the commands for a particular service, as well as the command sequences, so that the commands may be executed in the designated sequence order.

Conditional commands 1112 can include commands that are executed based on one or more conditions defined for them. For example, consider a conditional command 1113a such as ":#ACT_ALCATEL_CARD_MODEL:]"=="ADLT-L"||"[#ACT_ALCATEL_CARD_MODEL:]"=="ADLT-W". When the framework executes, the values of the conditional commands 1112 column are generally translated and evaluated. For instance, the result of the evaluation of the conditional command 1113a can determine whether a "CM_005" command 1113b of an "SV_007" service 1113c (e.g., both on the same row as the conditional command 1113a) is executed. In particular, if "ADLT-L==ADLT-L||ADLT-L==ADLT-W" is TRUE, then the "CM_005" command 1113b is executed. Otherwise, if the evaluation results in a FALSE result, then the "CM_005" command 1113b is not executed.

FIG. 12 shows an example message table 1200. Each row or entry in the message table 1200 may store a message ID 1202 and a corresponding message expression 1204. Each message ID 1202 may be a regular expression that is capable of being executed in order to determine a unique message ID 1202 given a particular message description 1204. The message table 1200 may be used for determining the message ID for a particular message.

FIG. 13 shows an example command message table 1300. Each row or entry in the message table 1300 may store a command ID 1302, a message ID 1304, a message sequence 1306, a suppress rollback indicator 1308, a message subtype 1310, a message result type 1312, a message code 1314, and a message description 1316. The command message table 1300 may be used to determine the values related to a value pair combining the command ID 1302 and the message ID 1304.

Figure 14:
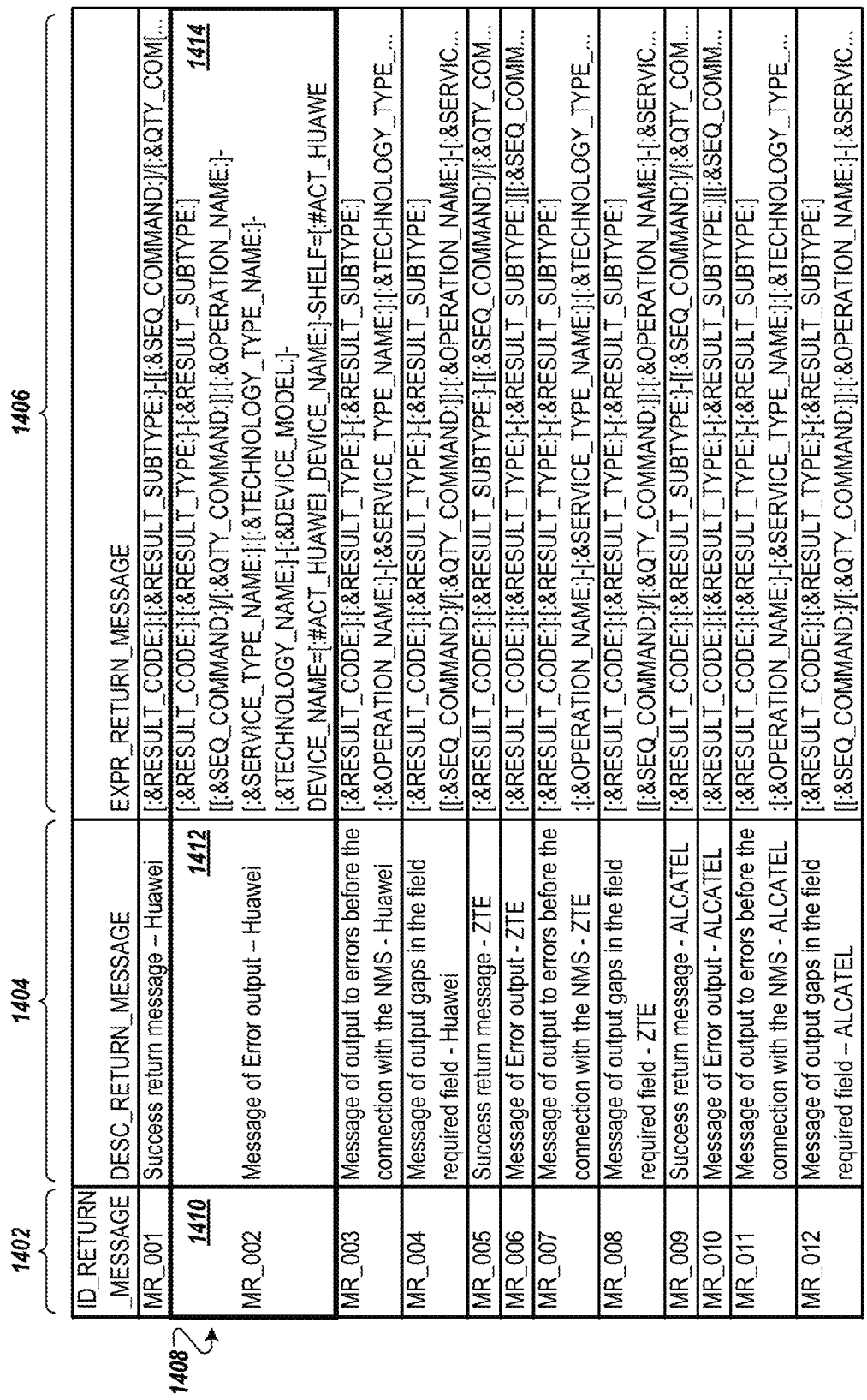

FIG. 14 shows an example return message table 1400. Each row or entry in the return message table 1400 may store a return message ID 1402, a return message description 1404, and a return message expression 1406. The return message table 1400 may be used to determine the return message expression 1406 corresponding to a particular return message ID 1402.

The detailed example that follows identifies one or more implementations of how specific entries in the configuration tables 1100 through 1400 may be used. When the adapter is started in the server (e.g., based on a file, such as Adapter-Configuration.xml), the adapter may read the configuration (stored in the tables or database) once, processing each request in memory.

The Activator application, such as the TELCORDIA® ACTIVATOR application 228, issues requests for a network to perform services. With regard to DSL, example services may include, for example, the CREATE, DELETE, and SUSPEND services. Each service is associated with a unique service ID, such as Service 1 1114 that has the value SV_001 for the service ID 1102, as defined in the configuration table 1100. In this example, SV_001 occupies five rows in the service command table 1100 because five commands are used to execute the service. Other services in the table are SV_002 through SV_007, each having various numbers of rows, one row per command. In some implementations, to determine a unique service ID, the framework can use the adapter name, adapter model and card model (e.g., all of which can be available in the XML request) to determine a group code. Using the group code and the operation name, the framework can uniquely determine the service to be executed.

A service, such as the CREATE service, may include one or more commands that are to be executed in sequence by the network in order to perform the service. Example commands may include, for example, LOGIN, PORT DISABLE ADSL, MODIFY PARAMETERS ADSL, ENABLE PORT ADSL, LOGOUT or other Asymmetric Digital Subscriber Line (ADSL) commands. Each command is associated with a unique command ID (e.g., any of the command IDs 1116 ranging from CM_001 through CM_005). For each service, the commands are executed in a sequence defined by the a sequence parameter 1106 (e.g., values 10, 20, 30, 40 and 50 that make up the sequences 1118). Using FIG. 11 as an example, Service 1 1114 includes commands 1, 2, 3, 4 and 5 executed in sequence, Service 2 1120 includes commands 1122 1, 2, 6 and 5 in sequence, and Service 3 1124 includes commands 1126 1, 2, 3, 4 & 5 in sequence.

Depending upon the service that the command is being used to implement, the command may be associated with a roll-back procedure, as identified in the service rollback column 1108, to un-do the service if an error is encountered. For example, Command 1 of Service 1 has no associated rollback procedure (e.g., as indicated by a "NULL" value 1128). Command 4 of Service 3 is associated with rollback procedure #9 1130. Notably, this same command 4 is associated with a different rollback procedure #6 1132, when performed in association with service 5.

Thus, one purpose of the service command table 1100 is to identify and designate the sequence of commands to be performed by the network for each service requested by the Activator application. The configuration tables, including the service command table 1100, may be loaded into memory at the time that the adapter is first instantiated. All processing may therefore occur within this memory.

In addition to the service command table 1100, the network adapter framework uses several other configuration tables to effect communication between the application and the network. The next configuration table, called the message table 1200 (FIG. 12), lists regular expressions (e.g., in the message expression column 1204) for all possible responses sent by the network, including a "catch-all" regular expression parameter 1206 for unknown or unidentified responses. Specifically, the "catch-all" regular expression parameter 1206 is a period, and the corresponding "catch-all" message ID 1208 is MS_031, as shown by table row 1210. Each possible response listed in the message expression column 1204 is associated with a unique message ID 1202. If for some reason the "catch-all" message ID 1208 is used significantly often for the same undefined message expression, and this situation is noticed by a user, a row for that message's definition may be added to the message table 1200.

The TELCORDIA ACTIVATOR® application may issue a command, which causes the network to generate the response. When the response is received by the network adapter framework, each regular expression (e.g., in the message expression column 1204) in the message table 1200 is executed in order to identify or isolate the unique message ID 1202 associated with the response.

When invoked, the (?m)[MESSAGE] parameter used by each regular expression in the message table 1200 indicates that a search should be performed on all of the lines of the response, in order to find a string that matches [MESSAGE]. In some implementations, other notation other than (?m) may have other meaning, such as to parse messages in other special ways. One purpose of the message table 1200, therefore, is to determine the unique message ID 1202 associated with each particular response. The unique message ID 1202 is used in later steps of processing.

If, based on performing the search using the (?m)[MESSAGE] regular expression parameters listed in the message table 1200, a string in the response matches the [MESSAGE], the matching unique message ID 1202 is output. Alternatively, the message ID 1208 having the value MS_031 corresponding to the "." regular expression parameter may be returned when none of the strings of the response match any of the [MESSAGE] parameters of the regular expressions listed in the message expression column 1204 of the message table 1200. This indicates that the network adapter framework has encountered an unknown response. Put another way, using the response as an input, the message table 1200 outputs a message ID 1202 associated with that response (e.g., message expression 1204).

The next configuration table, the command message table 1300 (FIG. 13), uses both the message ID 1304 and the command ID 1302 to output a message result type 1312, indicating whether the command was successful or whether a fatal or non-fatal error occurred (e.g., based on the message subtype 1310). The command message table 1300 also may output a suppress rollback indicator 1308, indicating whether the rollback process should be suppressed or not (e.g., based on the suppress rollback indicator 1308).

If no rollback is to be performed and the command was successful, the network adapter framework may allow another command to be processed, such as the next command in sequence. Furthermore, depending upon the particular message ID 1304 and command ID 1302, the command message table 1300 can also output other parameters, such as the result code 1314, which may be used in later stages of processing or for the creation of an output XML file.

In the following example of the use of regular expressions, the Activator application issues commands (e.g., using XML). Each command may include multiple discrete services, which are executed in sequence. The services and their sequence are identified using the service command table 1100, as discussed above.

Consider that the activator application 228 is performing the service CREATE. As shown in the service command table 1100, the CREATE service may be broken down into five separate steps or commands. For example, the steps may be: 1) LOGIN; 2) PORT DISABLE ADSL; 3) MODIFY PARAMETERS ADSL; 4) ENABLE PORT ADSL; and 5) LOGOUT. Furthermore, the five commands are to be executed in sequence, as shown by the command sequences 1106.

The first command (e.g., in this case, LOGIN) is sent by the framework to the network (e.g., using the Connection Manager adapter):

$$\text{ACT-USER:7302-MR-01-RJLLB07:SUPERUSER:} \\ \text{<INSERT\_CTAG\_HERE>::ANS\#150;} \quad (1)$$

The above represents the LOGIN command of the CREATE service. This command is sent from the network adapter framework to the network.

$$\begin{array}{l}\text{7340035 2008-02-01 19:40:04}\\\text{M 62 COMPLD}\\\quad\text{EN=0 ENDESC=Succeeded.;}\end{array} \quad (2)$$

The above represents the formatted response to the LOGIN command of the CREATE service. This response is sent from the network to the network adapter framework.

Referencing the regular expressions listed in the message table 1200, the term "Succeeded" is parsed from the above response, locating "Succeeded" on the third line of the response. Message ID "MS_001" 1212, corresponding to the term "Succeeded" 1214, is therefore output.

The known universe of possible message responses and their associated message IDs are pre-configured in the message table 1200. If an unknown response is received, a default message ID may be used, which might trigger an error condition (and force a rollback). Additional message IDs may be added to the message table 1200 at any time, such as to add the definition for an "unknown" response.

The MS_001 message ID 1304 and the CM_001 command ID 1302 are input to the command message table 1300. The subtype 1310 value of "Success," the result type 1312 value of "SUCCESS" and result code 1314 value of "0000" are output, indicating that the LOGIN command (CM_001) was executed successfully. No rollback is performed (e.g., the, suppress rollback indicator is "S"), and the next command is allowed to execute.

The next command, PORT DISABLE ADSL is then invoked:

$$\text{DACT-ADSLPORT::DEV=123,FN=0,SN=2,PN=321:} \\ \text{63::;} \quad (3)$$

The above represents the PORT DISABLE ADSL command of the CREATE service. This command is sent from the network adapter framework to the network.

$$\begin{array}{l}\text{7340035 2008-02-01 19:40:08}\\\text{M 63 COMPLD}\\\quad\text{EN=0 ENDESC=Error processing the command. Invalid OSR.;}\end{array} \quad (4)$$

The above represents the formatted response of the PORT DISABLE ADSL command of the CREATE service. This response is sent from the network to the network adapter framework.

Referencing the regular expressions listed in the message table 1200, the term "Error processing the command. Invalid OSR." is parsed from the above response. The network adapter framework executes each of the regular expressions; however, none include a string which matches the response message.

Accordingly, the message ID MS_031 1208 corresponding to the "." regular expression parameter is returned since none of the strings of the response match any of the [message] parameters of the regular expressions listed in the message table 1200. This indicates that the network adapter framework has encountered an unknown response. The "." regular expression parameter correlates to the "MS_031" message ID.

The MS_031 message ID 1304 and the CM_002 command ID 1302 are input to the command message table 1300 and, in the highlighted row 1318, the subtype "Unknown error" 1320, result type 1312 value of "FATAL ERROR" and result code 1314 value of "AAFN-6106E" are output, indicating that the PORT DISABLE ADSL command (CM_002) did not execute successfully.

Since the PORT DISABLE (CM_002) command was not successful, and the suppress rollback indicator is "N", rollback is performed. As highlighted in the service command table 1100, the rollback process associated with the CREATE command (SV_001) and the PORT DISABLE ADSL command (CM_002) is rollback service process SV_006 1134. This rollback process may or may not be disabled based on the enable rollback indicator 1110 of the service command table 1100.

Messages and processing used in the network adapter framework may include the use of XML files. For example, the Activator application issues commands to the network. The network processes the commands, and generates a response. The network adapter framework receives this response from the network, and may generate an XML file. The XML file is sent back to the Activator application as the result of the command which it issued earlier. Once the XML file is received, the activator can parse the XML and use the information collected to continue this or other processes. The XML file can be stored in the activator database, or in a directory, or by other means, depending on the implementation. The information included can be useful for the user of the client, because the user can read the details of the results of the activation made in the network by the adapters.

Depending upon the response from the network, the XML file may include different information, in various formats. The different information and formats may be generically represented using GADE variables in an additional configuration table, as shown in the return message expression column 1406 of the return message table 1400. As mentioned previously, GADE variables are substitution variables embedded in return messages. The GADE variables are replaced with actual values, depending on various factors. The content and format of the XML file may be altered by changing the content and format of the GADE variables.

For example, the row 1408 in the return message table 1400 defines the entry for a return message code MR_002 1410. A corresponding return message description 1412 describes the message as "Message of Error output—Huawei". GADE variables for the message are included in the return message expression cell 1414 containing "[:&RESULT_CODE:]:[:&RESULT_TYPE:] . . . " The first GADE variable is "[:&RESULT_CODE:]" and the second is [:&RESULT_TYPE:]. As is common with return messages containing GADE variables, other characters and punctuation may also exist, such as the colon (":") between the two GADE variables.

The response generated by the network (for example, in response to a Create, Delete, or Suspend service or a LOGIN command), includes information which is used to populate the GADE variables, thereby creating the XML file. In some implementations, the return message table 1400 cannot accommodate new variables unless deeper changes to the underlying software class (e.g., JAVA class) are made. However, any new variables are defined once, and thereafter are used (and re-used) multiple times as needed.

If an error is detected during the process, the information derived from the configuration tables may be used to populate an XML return message. The variables and their associated data sources are described below.

The returned message, before GADE variable substitution, may be, for example:

[:&RESULT_CODE:]:[:&RESULT_SUBTYPE:]-
[[:&SEQ_COMMAND:]/[:&QTY_COMMAND:]]:
[:&OPERATION_NAME:]-[:&SERVICE_TYPE_NAME:]:

-continued

[:&TECHNOLOGY_TYPE_NAME:]-
[:&TECHNOLOGY_NAME:]-[:&DEVICE_MODEL:]-
DEVICE_NAME=[:#ACT_HUAWEI_DEVICE_NAME:]-RACK=
[:#ACT_HUAWEI_RACK:]-SHELF=
[:#ACT_HUAWEI_SHELF:]-
SLOT=[:#ACT_HUAWEI_SLOT:]-PORT=
[:#ACT_HUAWEI_PORT:] (5)

During the process, GADE variables are filled with data values, as described in the following:

[:&RESULT_CODE:] = result code of the process
[:&RESULT_SUBTYPE:] = subtype of the result
[:&SEQ_COMMAND:] = sequential of the command
[:&QTY_COMMAND:] = quantity of the commands executed in the network
[:&OPERATION_NAME:] = the name of the service
[:&SERVICE_TYPE_NAME:] = type of service
[:&TECHNOLOGY_TYPE_NAME:] = the technology type
[:&TECHNOLOGY_NAME:] = the technology name
[:&DEVICE_MODEL:] = model device
[:#ACT_HUAWEI_DEVICE_NAME:] = the device name
[:#ACT_HUAWEI_RACK:] = rack of device
[:#ACT_HUAWEI_SHELF:] = shelf of device
[:#ACT_HUAWEI_SLOT:] = slot of device
[:#ACT_HUAWEI_PORT:] = port of device (6)

After filling in GADE variable values in the XML, the result may be:

0000:ERROR-[½]:CREATE-ADSL_BB:DSLAM-HUAWEI-TL1-
ISAM7302 XD-DEVICE_NAME=RJ-IPA05-EDSLAM-RACK=01-
SHELF=1-SLOT=06-PORT=44 (7)

Figure 15:
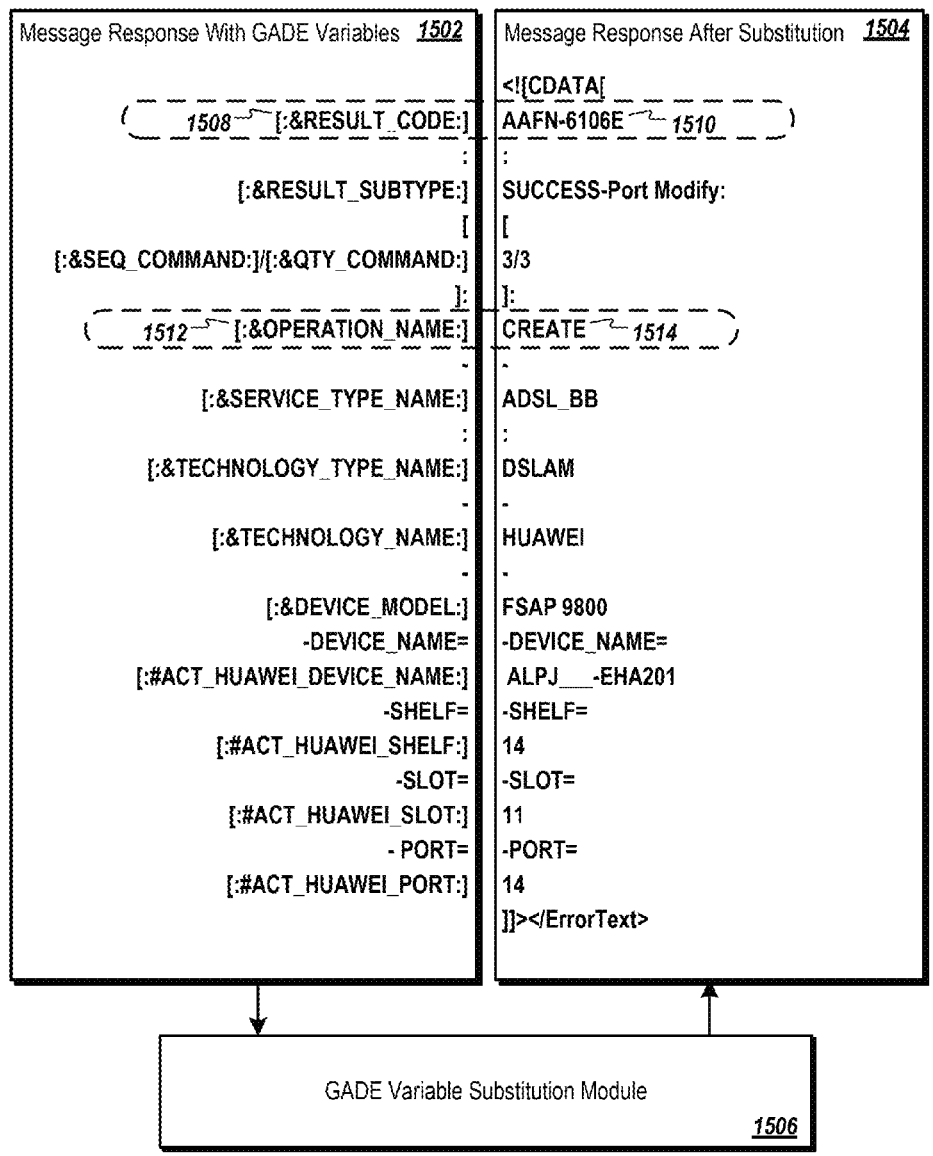
FIG. 15 shows an example translation of GADE variables into actual values in a return message.

FIG. 15 shows an example translation of GADE variables into actual values in a return message. For example, the translation may translate a message response with GADE variables 1502 into a message response after substitution 1504. The translation may be performed, for example, by a GADE variable substitution module 1506 using one or more configuration tables or other processes, as described above. As a result, in one example substitution, a GADE variable [:&RESULT_CODE:] 1508 may be replaced by a value AAFN-6106E 1510. In another example substitution, a GADE variable [:&OPERATION_NAME:] 1512 may be replaced with a value CREATE 1514. The following provides a more detailed discussion of the GADE variable substitution process.

When the adapter is activated, it may load the data of configuration files (e.g., using <ADAPTER_NAME>ADAPTERCONFIGURATION.XML). During this process, the GADE variables may be initialized with values configured in one or more parameter tables. When a request (e.g., via JMS messages) is posted in the adapter queue, the framework may process the request file and initialize another sets of GADE variables (e.g., by reading the XML stored in the variables).

For example, the following set of values, (e.g., stored in a parameter table) may be used to load the corresponding Huawei adapter variables:

ACT_HUHUAWEI_DEVICE_NAME= ALPJ_-EHA201
ACT_HUHUAWEI_SHELF=0
ACT_HUHUAWEI_SLOT=11
ACT_HUHUAWEI_PORT=14 (8)

Such values in the parameter tables may show the association of GADE variables with the XML path.

The example that follows describes GADE variable substitution that may occur for a PORT DISABLE ADSL HUAWEI service. After processing the XML file and defining the service that will be executed, the framework: 1) loads the network commands for the service (refer to the service command table 1100); and 2) associates the values read from XML with the corresponding GADE variables.

For each command or service, a message result containing GADE variables may exist, such as:

```
DACT-ADSLPORT::DEV=[:#ACT_HUAWEI_DEVICE_NAME:],
FN=[:#ACT_HUAWEI_SHELF:],SN=
[:#ACT_HUAWEI_SLOT:],
PN=[:#ACT_HUAWEI_PORT:]:<INSERT_CTAG_HERE>::;    (9)
```

Based in the values stored for the variables (e.g., in the parameter table), the framework may execute the appropriate substitution, forming the command, such as:

```
    DACT-ADSLPORT::DEV=ALPJ_-EHA201,FN=0,
        SN=11,PN=14:2343::;                       (10)
```

The framework sends the command to the communication module (e.g., the connection manager), that sends the message to the network, which in turn may return the response, such as:

```
        7344401 2009-01-29 23:08:56
        M   121802 COMPLD
            EN=0   ENDESC=Succeeded.
        ;]                                        (11)
```

Using regular expressions, the framework may match the network response with each previously-registered response (e.g., in the message table 1200).

If a match occurs, the framework may execute the process configured for that kind of response (e.g., using the command message table 1300). Based in the message ID column 1202 in the message table 1200, the framework may verify the relationship (e.g., Hibernate) with the command message table 1300, getting the next process to be executed. In a case of an error, the next process may be a rollback command.

Assuming that the network answer indicates success, the next command may be loaded and processed in the same way.

Next, the framework may load the next command (MODIFY PARAMETERS ADSL HUAWEI):

```
MOD-ADSLPORT::DEV=
[:#ACT_HUAWEI_DEVICE_NAME:],
FN=[:#ACT_HUAWEI_SHELF:],
SN=[:#ACT_HUAWEI_SLOT:],
PN=[:#ACT_HUAWEI_PORT:]:<INSERT_CTAG_HERE>::
LPROFID=[:#ACT_HUAWEI_PRIMARY_PROFILE:],ALIAS=
[:#ACT_HUAWEI_ALIAS:];                            (12)
```

Substituting the GADE variables, the next command may be built:

```
    MOD-ADSLPORT::DEV=ALPJ___-EHA201,
    FN=0,SN=11,PN=14:4323::LPROFID=VELOX1000GDMT,
    ALIAS=MCOAD5077916;                           (13)
```

After the command is sent to the network, a response may be received, such as:

```
7344401 2009-01-29 23:08:57
M   121803 COMPLD
    EN=0   ENDESC=Succeeded.
;]
ACT-ADSLPORT::DEV=ALPJ___-EHA201,FN=0,SN=11,PN=
14:121804::;7344401 2009-01-29 23:08:57
M   121804 COMPLD
    EN=0   ENDESC=Succeeded.
;]                                                (14)
```

After processing all the commands of the service, the GADE variables are generated with values of the process, allowing the framework to generate and send the fully-qualified response to the owner of the request. As shown in the return message table 1400, different types of responses may exist, one for each kind of situation. To find the correct XML answer, the adapter may use a return message (e.g., from a response table or from the return message column of the return message table 1400.)

The framework may fill in the XML with the GADE values and send a message (with the generated XML) to the queue. At this moment, all GADE variables are "clean" (e.g., translated into actual values)

For example, a response originally containing un-substituted GADE variables may be:

```
<NetworkResponse>
[:&RESULT_CODE:]:[:&RESULT_SUBTYPE:]-
[[:&SEQ_COMMAND:]/[:&QTY_COMMAND:]]:
[:&OPERATION_NAME:]-[:&SERVICE_TYPE_NAME:]:
[:&TECHNOLOGY_TYPE_NAME:]-
[:&TECHNOLOGY_NAME:]-[:&DEVICE_MODEL:]-
DEVICE_NAME=[:#ACT_HUAWEI_DEVICE_NAME:]-
SHELF=[:#ACT_HUAWEI_SHELF:]-SLOT=
[:#ACT_HUAWEI_SLOT:]-PORT=[:#ACT_HUAWEI_PORT:]
</NetworkResponse>                                (15)
```

As a result of substitution, the XML response generated may be:

```
<NetworkResponse>
<![CDATA[AAFN-6106E:SUCCESS-Port Modify:[3/3]:CREATE-
ADSL_BB:DSLAM -HUAWEI-FSAP 9800-DEVICE_NAME=
ALPJ___-EHA201-SHELF=14-SLOT=11-PORT=14]]>
</ErrorText></ NetworkResponse >                  (16)
```

The framework described herein may be configured to use GADE variables. GADE variables were developed to assist the enhanced framework to configuring an adapter, and the variables serve as a customized language that is specific to the enhanced framework. The language can be used to configure the network commands and responses in the configuration tables or other tables in the framework.

The GADE variable is a language component of regular expressions with terms defined specifically to an adapter. The terms can be defined, for example, in the following language POSIX standard syntax. An expression is initiated by an open bracket followed by a colon (e.g., "[:"). An expression is terminated by a colon followed by a closing bracket (e.g., ":]"). The first character (e.g., "$", "&", etc.) of a GADE variable can denote the meaning of the term, as will now be described.

A GADE variable starting with a dollar sign and used as a direct reference to a variable can have the format [:$<path>:].

In this case, the regular expression <path> can be replaced with the parameter that is to be used.

A GADE variable starting with a pound symbol and used as an indirect reference to a variable can have the format [:#<name>:]. In this case, the regular expression <name> can be replaced with the name of the parameter that is to be used.

A GADE variable starting with an "amperes and" and used simply as a GADE variable can have the format [:@<name>:]. In this case, the framework can access the value of the variable previously declared and initialized (e.g., "Definition of variable . . . ").

A GADE variable starting with "&" and used as an environment variable can have the format [:&<name>:]. In this case, the framework can access the value of the environment variable, for example UUID (e.g., for 64-bit identifiers), SEQ (sequential number generated for each command), and ROLLBACK (result of processing: Y=success; N=Failure).

A GADE variable used as the first position of an array can have the format [:@name$:]. In this case, the variable can be used to access the value of the first position of a variable array.

A GADE variable used as a position of an array can have the format [:@name$(1):]. In this case, the variable can be used to access the value of any position of the variable array. The desired position is indicated with parentheses, where the first position can be zero (typically) or one.

A GADE variable used as an array size can have the format [:@name$qty:]. In this case, the variable can be used to identify the number of values in the array, or the available space in the array.

In general, GADE variables and expressions can determine various characteristics of adapters in the framework. For example, GADE variables can reference an external value set by the adapter and javabean, such as an adapter request (e.g., "AdapterRequest") identified with the dollar ("$") character. GADE variables can also provide an alias or name that represents a parameter set in the parameter table. Also, GADE variables can be used in the initialization of environment variables within the context of implementation of the adapter. Finally, GADE variables can provide reference to a variable initialized within the context of the implementation of the adapter.

In one example of an expression using GADE variables, such as in an "AdapterRequest," the expression can be similar to the following:

LOGIN:::EQ=[:#equip_id:]::UN=[:#username:],PWD=
[:#password:],GROUP=[:#default-group:]      (17)

Figure 16:
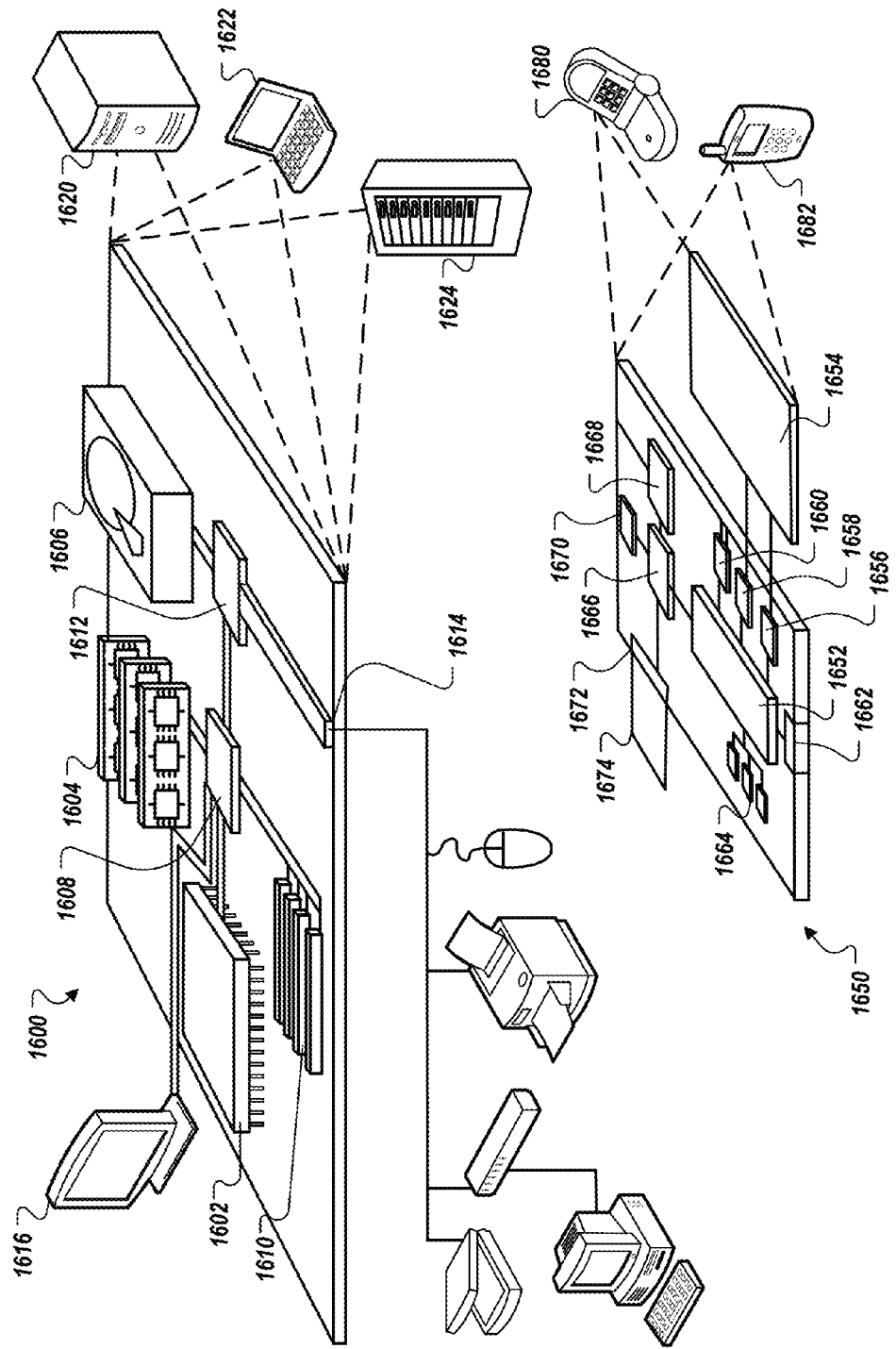
FIG. 16 is a block diagram of exemplary computing devices that may be used to implement the network adapter framework.

FIG. 16 is a block diagram of computing devices 1600, 1650 that may be used to implement the enhanced network adapter framework, as either a client or as a server or plurality of servers. Computing device 1600 is intended to represent various forms of digital computers, such as laptops, desktops, workstations, personal digital assistants, servers, blade servers, mainframes, and other appropriate computers. Computing device 1650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 1600 includes a processor 1602, memory 1604, a storage device 1606, a high-speed interface 1608 connecting to memory 1604 and high-speed expansion ports 1610, and a low speed interface 1612 connecting to low speed bus 1614 and storage device 1606. Each of the components 1602, 1604, 1606, 1608, 1610, and 1612, are interconnected using various busses, and may be mounted on a common motherboard or in other manners as appropriate. The processor 1602 may process instructions for execution within the computing device 1600, including instructions stored in the memory 1604 or on the storage device 1606 to display graphical information for a GUI on an external input/output device, such as display 1616 coupled to high speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a computer-readable medium. In one implementation, the memory 1604 is a volatile memory unit or units. In another implementation, the memory 1604 is a non-volatile memory unit or units.

The storage device 1606 is capable of providing mass storage for the computing device 1600. In one implementation, the storage device 1606 is a computer-readable medium. In various different implementations, the storage device 1606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1604, the storage device 1606, or memory on processor 1602.

The high speed controller 1608 manages bandwidth-intensive operations for the computing device 1600, while the low speed controller 1612 manages lower bandwidth-intensive operations. Such allocation of duties is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1606 and low-speed expansion port 1614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a personal computer such as a laptop computer 1622. Alternatively, components from computing device 1600 may be combined with other components in a mobile device (not shown), such as device 1650. Each of such devices may contain one or more of computing device 1600, 1650, and an entire system may be made up of multiple computing devices 1600, 1650 communicating with each other.

Computing device 1650 includes a processor 1652, memory 1664, an input/output device such as a display 1654, a communication interface 1666, and a transceiver 1668, among other components. The device 1650 may also be provided with a storage device, such as a microdrive or other device, to provide additional storage. Each of the components 1650, 1652, 1664, 1654, 1666, and 1668, are interconnected using various buses, and several of the components may be mounted on a common motherboard or in other manners as appropriate.

The processor 1652 may process instructions for execution within the computing device 1650, including instructions stored in the memory 1664. The processor may also include separate analog and digital processors. The processor may provide, for example, for coordination of the other components of the device 1650, such as control of user interfaces, applications run by device 1650, and wireless communication by device 1650.

Processor 1652 may communicate with a user through control interface 1658 and display interface 1656 coupled to a display 1654. The display 1654 may be, for example, a TFT LCD display or an OLED display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may be provide in communication with processor 1652, so as to enable near area communication of device 1650 with other devices. External interface 1662 may provide, for example, for wired communication (e.g., via a docking procedure) or for wireless communication (e.g., via Bluetooth or other such technologies).

The memory 1664 stores information within the computing device 1650. In one implementation, the memory 1664 is a computer-readable medium. In one implementation, the memory 1664 is a volatile memory unit or units. In another implementation, the memory 1664 is a non-volatile memory unit or units. Expansion memory 1674 may also be provided and connected to device 1650 through expansion interface 1672, which may include, for example, a SIMM card interface. Such expansion memory 1674 may provide extra storage space for device 1650, or may also store applications or other information for device 1650. Specifically, expansion memory 1674 may include instructions to carry out or supplement the processes described above, and may include secure information also. Thus, for example, expansion memory 1674 may be provide as a security module for device 1650, and may be programmed with instructions that permit secure use of device 1650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1664, expansion memory 1674, or memory on processor 1652.

Device 1650 may communicate wirelessly through communication interface 1666, which may include digital signal processing circuitry where necessary. Communication interface 1666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1668. In addition, short-range communication may occur, such as using a Bluetooth, WiFi, or other such transceiver (not shown). In addition, GPS receiver module 1670 may provide additional wireless data to device 1650, which may be used as appropriate by applications running on device 1650.

Device 1650 may also communication audibly using audio codec 1660, which may receive spoken information from a user and convert it to usable digital information. Audio codex 1660 may likewise generate audible sound for a user, such as through a speaker, e.g., in a handset of device 1650. Such sound may include sound from voice telephone calls, may include recorded sound (e.g., voice messages, music files, etc.) and may also include sound generated by applications operating on device 1650.

The computing device 1650 may be implemented in a number of different forms, as shown in the figure. For example, it may be implemented as a cellular telephone 1680. It may also be implemented as part of a smartphone 1682, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions. Although the use of JAVA code and Telcordia Activator software is discussed herein, this disclosure invention is not limited to any particular software or language implementation.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   storing parameters in one or more configuration tables, wherein the parameters are customized for a network and an application, and wherein the parameters of one configuration table map a network-specific status code returned from the network to a message code, and wherein the parameters of another configuration table map the message code and a network-specific command to an application-specific result code that is to be sent to the application;
   instantiating a network adapter customized for the network and the application by invoking a generic network adapter which externally references the parameters stored in the one or more configuration tables; and
   effecting communication between the application and the network using the instantiated network adapter.

2. The method of claim 1, wherein the generic network adapter comprises a JAVA EE-based network adapter.

3. The method of claim 1, wherein the parameters are expressed in regular expressions.

4. The method of claim 1, further comprising:
   invoking the generic adapter using a single configuration load of the one or more configuration tables.

5. The method of claim 1, further comprising:
   detecting a type of the network and the application; and
   selecting the one or more configuration tables from among a plurality of configuration tables based on the detected type of the network and the application.

6. The method of claim 1, wherein the network adapter is instantiated in a loopback mode.

7. A system comprising:
   one or more computers; and
   a computer-readable medium coupled to the one or more computers having instructions stored thereon which, when executed by the one or more computers, cause the one or more computers to perform operations comprising:
      storing parameters in one or more configuration tables, wherein the parameters are customized for a network and an application, and wherein the parameters of one configuration table map a network-specific status code returned from the network to a message code, and wherein the parameters of another configuration table map the message code and a network-specific command to an application-specific result code that is to be sent to the application;
      instantiating a network adapter customized for the network and the application by invoking a generic network adapter which externally references the parameters stored in the one or more configuration tables; and
      effecting communication between the application and the network using the instantiated network adapter.

8. The system of claim 7, wherein the generic network adapter comprises a JAVA EE-based network adapter.

9. The system of claim 7, wherein the parameters are expressed in regular expressions.

10. The system of claim 7, wherein the operations further comprise invoking the generic adapter using a single configuration load of the one or more configuration tables.

11. The system of claim 7, wherein the operations further comprise:
    detecting a type of the network and the application; and
    selecting the one or more configuration tables from among a plurality of configuration tables based on the detected type of the network and the application.

12. The system of claim 7, wherein the network adapter is instantiated in a loopback mode.

13. A non-transitory computer storage medium encoded with a computer program, the program comprising instructions that when executed by data processing apparatus cause the data processing apparatus to perform operations comprising:
    storing parameters in one or more configuration tables, wherein the parameters are customized for a network and an application, and wherein the parameters of one configuration table map a network-specific status code returned from the network to a message code, and wherein the parameters of another configuration table map the message code and a network-specific command to an application-specific result code that is to be sent to the application;
    instantiating a network adapter customized for the network and the application by invoking a generic network adapter which externally references the parameters stored in the one or more configuration tables; and
    effecting communication between the application and the network using the instantiated network adapter.

14. The computer storage medium of claim 13, wherein the generic network adapter comprises a JAVA EE-based network adapter.

15. The computer storage medium of claim 13, wherein the parameters are expressed in regular expressions.

16. The computer storage medium of claim 13, wherein the operations further comprise invoking the generic adapter using a single configuration load of the one or more configuration tables.

17. The computer storage medium of claim 13, wherein the operations further comprise:
    detecting a type of the network and the application; and
    selecting the one or more configuration tables from among a plurality of configuration tables based on the detected type of the network and the application.

18. The computer storage medium of claim 13, wherein the network adapter is instantiated in a loopback mode.

* * * * *